United States Patent [19]

Alison

[11] 4,390,316
[45] Jun. 28, 1983

[54] TURBINE WHEEL

[76] Inventor: John R. Alison, 4200 Massachusetts Ave., #117, NW., Washington, D.C. 20016

[21] Appl. No.: 256,182

[22] Filed: Apr. 21, 1981

[51] Int. Cl.³ .............................................. F01D 1/34
[52] U.S. Cl. ........................................ 415/76; 415/90; 415/202
[58] Field of Search ...................... 415/76, 90, 202, 52

[56] References Cited

U.S. PATENT DOCUMENTS 2,043,788  6/1936  Adair ............................. 415/76 UX Primary Examiner—Philip R. Coe
Assistant Examiner—Joseph M. Pitko
Attorney, Agent, or Firm—John L. Hummer

[57] ABSTRACT

A simple, rugged and wide velocity range radial flow turbine wheel, with entry flow radially inward and exhaust flow radially outward, has an efficient integral fluid-dynamic multiple staging system needing no stationary devices for redirecting the fluid. Consequently there are no clearance problems, and it can be used with all fluids, including contaminated ones. The tangentially-entering fluid stream is captured and trapped in an annular passageway between an outer set of circumferentially mounted blades and a carefully coordinated inner set of circumferentially mounted planar surfaces. Energy is extracted from the stream when the flow direction is changed each time the faster-moving fluid is vectored radially inwardly from a blade to an inner surface, then vectored radially outwardly to the next blade, then to the next inner surface, etc. All of the pressure, lift and drag forces contribute to turbine output. Flow of the fluid continues around the annular passageway, which also has integral lateral boundaries, until such time as the relative velocity of the fluid and the rotating blades reaches zero. Then the fluid is exhausted radially outwardly by centrifugal force between the blades, which can no longer maintain their trapping action. Because fluid exhaust can occur anywhere on the periphery except in the entry zone itself, flow conditions in the wheel can adapt to wide ranges of speed and loading. The fluid can experience thousands of degrees of magnitude of angular directional change in a single circumferential passage relative to the moving wheel.

40 Claims, 27 Drawing Figures

TURBINE WHEEL

BACKGROUND OF THE INVENTION

1. Field of the Invention

This invention relates generally to the turbine arts and particularly to a novel turbine wheel designed according to fluid-dynamic principles, that is useful for high, medium and low velocity applications and for incompressible and compressible fluids, including vapors and gases of combustion, as well as heavily contaminated fluids such as geothermal steam.

2. Prior Art

Modern turbines for compressible fluids frequently contain a stage consisting of a nozzle or row of nozzles followed by alternating rows of moving and stationary blades. Large turbines may have a succession of compounding actions or multiple stages. Complex and bulky stationary blade assemblies or other stationary devices often redirect or even reverse the fluid flow to properly enter or re-enter the moving blade structures, where all of the mechanical torque is generated. These expensive stationary structures produce no useful output and add to the weight of the turbine. Some energy is lost as the fluid passes through the winding stationary passages.

Turbines for incompressible fluids include the historic undershot, overshot, and horizontal slow speed water wheels, followed by the modern higher speed Pelton, Francis, and propeller types. The use of multiple staging, in which the injected fluid is passed through successive blade systems analogous to those of the compressible fluid turbines, has not been featured in these hydraulic developments. But the critical flow requirements of the stationary guide case, the desirability of adjusting blade angle, and the bearing requirements frequently introduce complexity nevertheless. Aside from the Pelton wheel, the axial direction has been generally featured for fluid entry.

Thus the existing techniques have frequently resulted in complicated designs for all fluids involving such things as counter-rotating wheels, gearing, thrust bearings, spiral guide cases, blade angle adjusting controls, stationary redirecting structures, a plurality of closely-fitted and non-simple blade shapes and other expensive parts for different stages in the same turbine, and sophisticated fabrication.

The important conclusion to be drawn from the above recital is that the mainstream of development in turbines for either compressible or incompressible fluids has not centered on creating an efficient multiple staging system which is totally integral with the turbine wheel. This is achieved in the present invention through effective exploitation of the inward and outward radial directions.

Conventional devices are not completely satisfactory today when any of the following considerations are important: increased simplicity, freedom from thrust bearings or stationary blade structures, a need for an inherently balanced and rugged moving blade structure, ability of a design to be used over a range of operating conditions or to accept contaminated fluid such as geothermal steam without clearance problems, lower cost, factory production limitations as may exist in developing countries, and ready scaling of the same basic turbine wheel design to produce large capacity units or to meet different operating requirements. All of these considerations are facilitated by the present invention through its unique integral multiple staging system.

Although it had been previously unknown to the inventor, a search disclosed the existence of several early but grossly incomplete attempts somewhat in the direction of the present invention. These earlier efforts all failed because they did not contain the requisite elements, or involved impractical arrangements, or included faults in design or concept which were not overcome. These gaps indicate non-recognition of basic problems which must be solved.

Thus the history of the turbine wheel art soon abandoned this particular trend of endeavor and moved on to the developments described in the preceding paragraphs. Without being aware of this background, the present inventor addressed the difficulties which he overcame so that the flaws in the prior art stand out.

Attention is called to the following references:

| U. S. PAT. NOS. | | | |
|---|---|---|---|
| 28,682 | 6/1860 | Morehouse | 416/178 |
| 705,001 | 7/1902 | Widner | 415/52 |
| 792,143 | 6/1905 | Matthews | 415/52 |
| 809,711 | 1/1906 | Maier | 416/183 |
| 985,152 | 2/1911 | Fieroe | 416/178 |
| 1,127,678 | 2/1915 | Rector | 415/52 |
| 3,923,416 | 12/1975 | Frey | 415/76 |

| FOREIGN PATENTS OR APPLICATIONS | | | |
|---|---|---|---|
| 7 762 | 3/1912 | Waugh et al | Great Britain |
| 364 876 | 1/1932 | Pearson | Great Britain |
| 727,519 | 6/1932 | Czernow | France |
| 338 358 | 3/1936 | Murtas et al | Italy |
| 961,999 | 5/1950 | Courtel et al | France |

PUBLICATIONS

FIG. 160, p. 83, *Dampfturbinen*, W. Gentsch, Helwingsche Verlagsbuchhandlung, Hannover, 1905.

The four patents of Morehouse, Maier, Waugh and Murtas involve an integral turbine wheel and are the most applicable. They share a major central fault which renders them impractical. Each is designed with highly concave hub surfaces which cause large angular changes in flow direction and resulting impact. This negates streamline flow, induces turbulence, and causes abrupt interruption of the orderly flow within the wheel with resulting inefficiency. In addition, Morehouse and Murtas disclose blades which do not cover the entire wheel periphery. The concept of Morehouse is to trap fluid into an eddying motion in a single chamber, and only allow flow "with difficulty" through an opening into the next chamber. Maier and Murtas use curved surfaces on the outer perimeter which will cause flow interruption at an earlier period giving essentially the effect of a single stage impact turbine. Morehouse does not have a true annular passageway, but actually requires most of the fluid to exhaust its energy in the eddying motion between the hub and the first blade encountered by the entering fluid, with only a portion of the fluid passing on to the next blade, and only a few blades working at any time.

If an idealized fluid is imagined to exactly follow the highly concave hub surfaces of Morehouse, Waugh and Murtas as depicted in their patent drawings, it will be found to change direction by the unreasonably high figure of about 90 degrees in each sector of the hub. The corresponding figure in Maier's drawing is about 70 degrees, which is still unreasonably high. This angular change is so abrupt that it will effectively aero-dynamically or fluid-dynamically stall the flow of the fluid through the turbine wheel and thereby limit the energy which can be extracted from the fluid stream.

Furthermore, the idealized exit direction of each highly curved hub surface of Morehouse, Maier, Waugh and Murtas is almost perpendicular to the surface of the next-encountered blade. This is like trying to fly an airplane wing crosswise to the wind instead of through the wind at an aero-dynamically reasonable angle of attack.

Morehouse's wheel cannot significantly operate with incompressible fluids, while Waugh's requires a casing to function. A lack of attention to fluid mechanics characterizes all four patents. The use of high hub curvature in every case aids the early escape of fluid when it impacts the succeeding blade. Fluid trapping by the blades is rendered ineffective by this fatal flaw.

It must be pointed out that the highly curved hubs of these references are not functionally equivalent to the hub geometry of the present invention.

The present invention eliminates the above and other objectionable features. Blade geometry and hub geometry are carefully coordinated herein to preserve a smooth flow of the fluid throughout the wheel, allowing energy to be extracted from the fluid stream over a large number of controlled directional changes, with a resulting increase in efficiency over a wide range of turbine speeds and loads.

SUMMARY OF THE INVENTION

A turbine extracts energy from a stream of fluid, such as water, air, steam, and hot gases, by lowering both the stream pressure and velocity or either one alone. A reaction turbine has pressure drops across both moving and stationary blades. An ideal impulse turbine has no pressure drops across either moving or stationary blades and operates by lowering only the velocity of the fluid as it passes through the moving blades. Both of these types have pressure drops across their injecting nozzles.

This invention provides an improved turbine wheel whose basic design is simple and suitable for all speeds and for fluids of all types and for use in both impulse and reaction situations.

In the following description, an axial direction is taken parallel to the axis of rotation of the wheel, while a transverse direction lies in a plane perpendicular to the axis of rotation. The tangential direction at any point is always taken transversely in the direction or rotation perpendicular to a radial to that point. Radials of the turbine wheel pass through and are perpendicular to the axis of rotation.

The verb "vector" means to change the direction of motion, as of a stream of fluid, by passing it over a surface that is not parallel to the stream. This surface either forcibly deflects the stream and receives a positive pressure force, or the stream itself tends to follow the surface, thereby generating a negative pressure or lift force as it passes over the surface. A surface over which fluid flows also tends to be dragged along by the fluid, or experience a drag force.

Fluid injection into the turbine wheel can be accomplished by a single nozzle or a set of nozzles in a single entry zone, or by entry zones symmetrically placed about the wheel periphery. A nozzle is tangentially directed between the blades into the blade region. There the blade surfaces vector the stream into a 360 degree circumferential passageway. Once inside this annular passageway, the faster-moving stream is further vectored, alternating between geometrically coordinated sawtooth surfaces of an inner hub and the annular passageway surfaces of the blades.

DETAILED DESCRIPTION OF THE DRAWINGS

These relationships are best explained in terms of an example.

Figure 1:
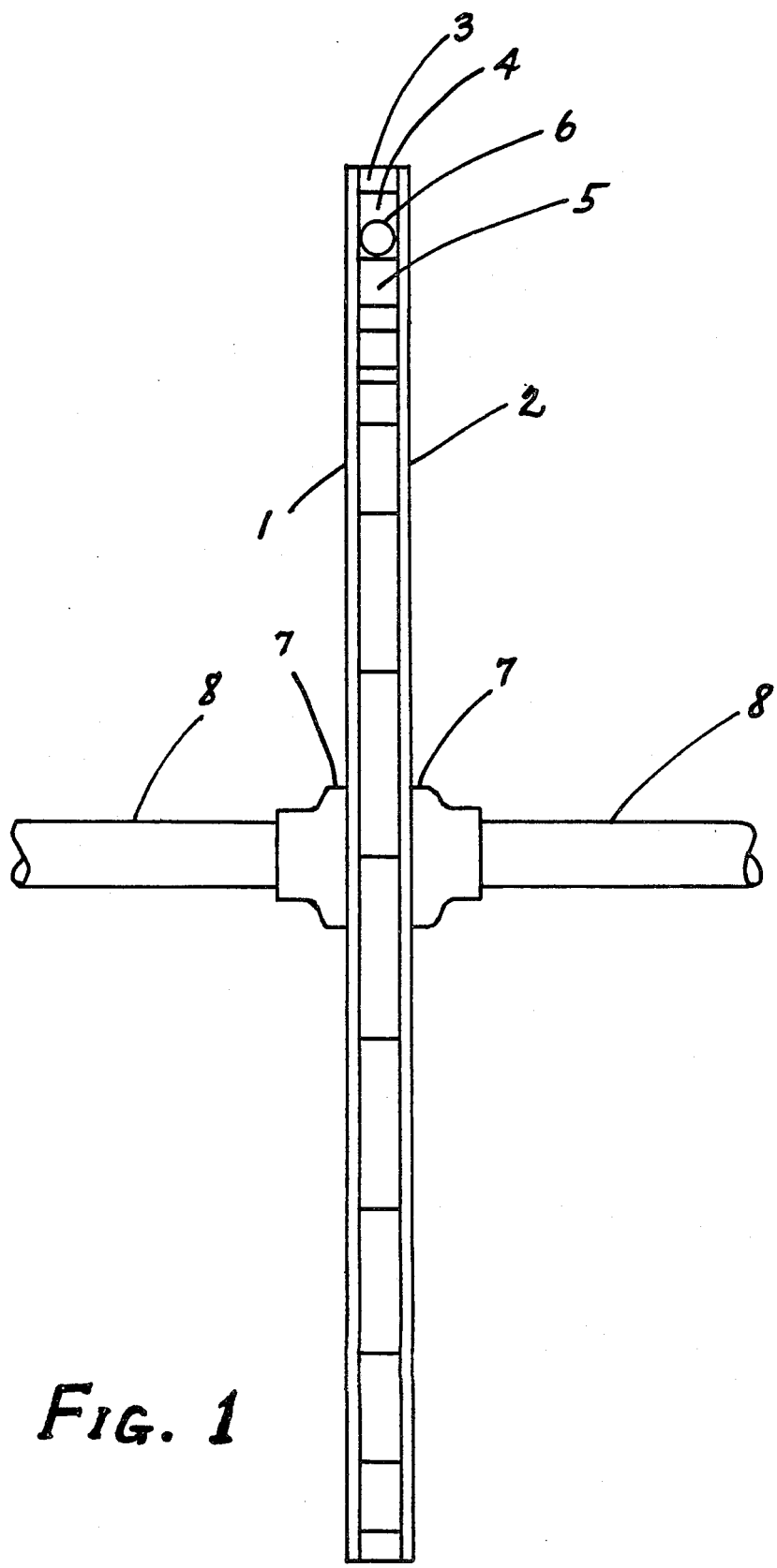
FIG. 1 illustrates one variety of turbine wheels according to the present invention viewed transversely.
Figure 2:
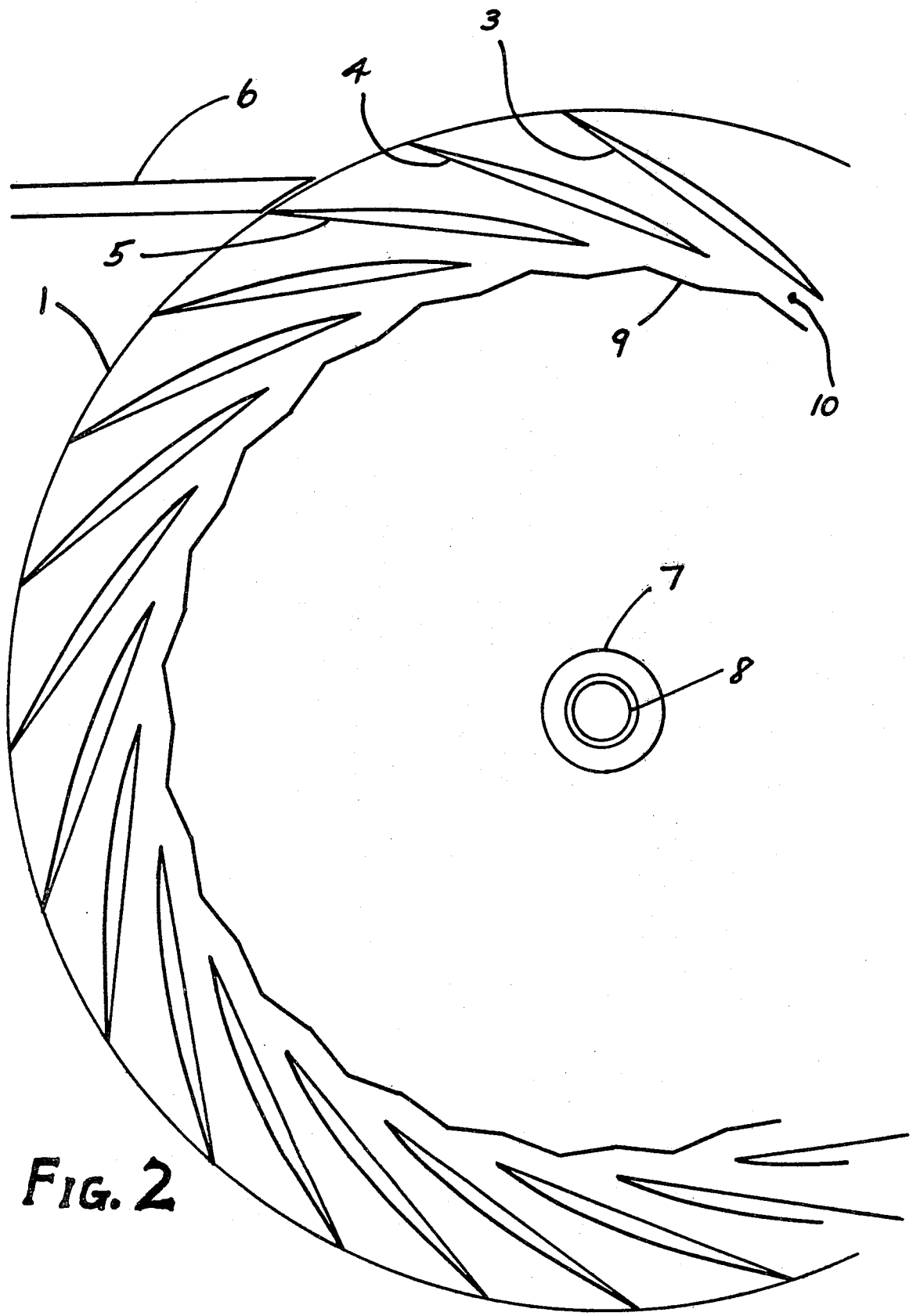
FIG. 2 depicts the same wheel of FIG. 1 viewed axially.

FIG. 1 illustrates one variety of turbine wheel according to the present invention as viewed transversely. FIG. 2 depicts the same wheel looking axially toward side 2, which has been made transparent to observe the fluid flow. Between sides 1 and 2 are mounted 24 blades 15 degrees apart. Typical blades are numbered 3, 4 and 5. The injecting nozzle 6 introduces the fluid tangentially into the wheel between the blades. At the instant shown, blade 4 would receive the stream, and together with adjacent blade 5 would vector the stream onto the sawtooth-faced hub 9, which, in turn, would vector it onto blade 3, and thence back to the hub, etc. The rotative forces of the fluid on the blades, hub and sides are transmitted by the sides 1 and 2 through the collars 7 to the shaft 8.

If the wheel is blocked from rotating, the stream will be found to be completely captured and trapped in the annular passageway 10 formed by the sides, the hub and the blades. Depending upon the velocity, the stream will effectively follow the hub for nearly the full 360 degrees and will be found escaping just before the nozzle region at the wheel periphery.

If the wheel is allowed to turn against a suitable load, the fluid will escape everywhere on the periphery that it falls below the wheel speed, except at the nozzle, and interference with the incoming stream in the entry zone will decrease materially. With a wide variety of speeds and loads, no interference will be seen.

An object of the invention is to extract energy from the fluid stream in a completely internal, fluid-dynamically-designed, compounding or staging system that rotates integrally with the turbine wheel. A circumferential succession of efficient moving stages is designed within the annular passageway, based upon aerodynamic, and more generally, fluid-dynamic principles. The entering stream must always be faster than the wheel speed in order for the stream to be captured and forced to be vectored, or trapped, within the annular passageway. The system is inherently capable of changing the direction of the fluid stream so long as such redirection is required, and without any need for expensive stationary redirecting devices.

Figure 3:
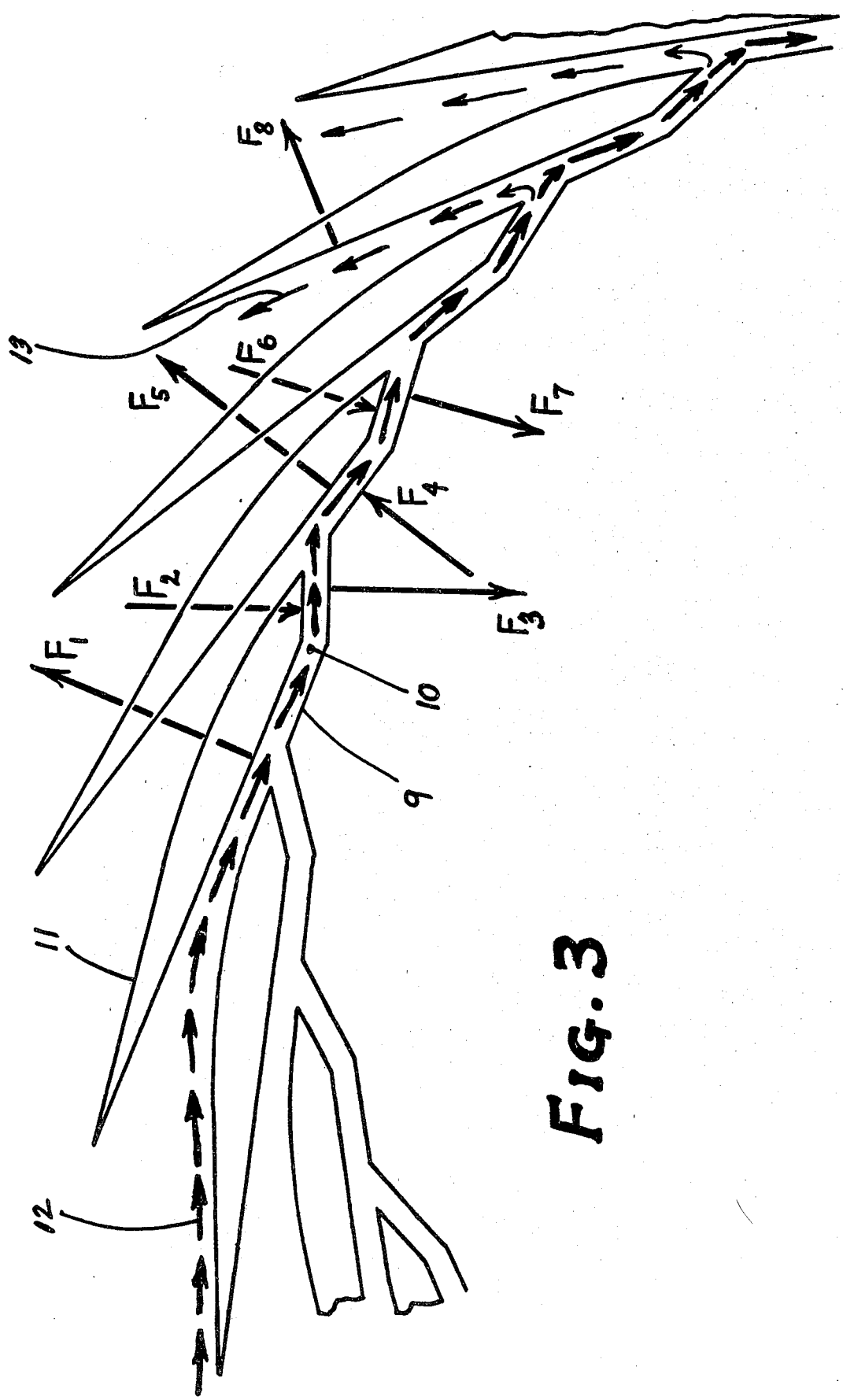
FIG. 3 depicts typical forces generated on the vectoring surfaces of the invention and the blade shape of the preferred embodiment.

This process of vectoring the stream is always accompanied by the generation of forces on the vectoring surfaces. Typical forces are illustrated in FIG. 3. Attention is called to the fact that FIG. 3 employs the blade shape of the preferred embodiment. 9 is the hub, while 11 is a typical blade. The fluid is represented by a stream of arrows 12. $F_1$ is the pressure force generated by vectoring into the annular passageway 10. $F_2$ and $F_6$ are lift forces on blades, and $F_4$ is a lift force on the hub. $F_3$ and $F_7$ are pressure forces on the hub, while $F_5$ is a pressure force on a blade. $F_8$ is a pressure force from a small amount of fluid 13 being exhausted from the wheel.

A very large total magnitude of angular directional change can be experienced by the fluid as it progresses around the annular passageway, losing energy to the wheel with each successive fluid-vectoring action. Thousands of degrees of total magnitude of angular change can be achieved.

As a result of the vectoring being accomplished completely within the turbine wheel without the use of stationary redirecting blades or structures, all of the fluid dynamic pressure, lift and drag forces have useful work-producing components in the direction of turbine rotation and contribute to turbine output.

A uniform cross-section portion of the annular passageway can minimize pressure drops within the wheel.

A compressible fluid expands with a velocity increase wherever pressure drops exist within the wheel due to periodic narrowing or convergence of a portion of the annular passageway. An incompressible fluid can simply increase velocity in such a convergent portion. Thus the present invention can achieve impulse or reaction effects wholly within the moving wheel, including a combination of both.

The foregoing and other objects are achieved according to the present invention by mounting a set of overlapping blades having an aero-dynamically, or more generally a fluid-dynamically shaped profile, at regular intervals on the outer circumferential periphery of the annular passageway, between closed parallel circular end plates held by a closed rotatable hub. There are a number of equivalent wheel structures also encompassed by this invention, such as mounting the hub between end plates which are themselves on bearings, or using a double-rimmed wheel, or a totally integral piece, etc. The blades may fit into recesses in the end plates or be screwed to the plates, or even have a lengthwise hollow for a bolt that spans the entire distance between the end plates, etc. It is often desirable to employ a simple structure that is readily disassembled for easy blade replacement and maintenance, particularly when contaminated fluids are employed.

A set of exactly twice as many hub sawtooth-like planar faces as blades forms the polyhedral surface of the annular passageway's closed inner circumferential periphery. The outer blade surface directions and the inner sawtooth surface directions are coordinated and chosen to achieve four objects: first, provide an efficient entrance for the stream everywhere on the outer periphery of the wheel; second, provide a continuing circumferential passageway sized for the entire amount of the fluid in the entering stream or streams; third, provide geometrically alternating and cooperative fluid vectoring and trapping actions; and fourth, provide some final energy extraction from the fluid as it exits from the wheel radially outward through the blade region.

It is always understood throughout this disclosure that angled surfaces and sharp edges may be rounded as required to facilitate streamline fluid flows and improve structural integrity and durability with particular respect to erosion. This is expressly true with regard to the outer tips of the blades in order to minimize vibration as well as erosion. All of the drawings shown herein show an idealized sharp outer tip for the purpose of illustrating blade generation. Knowledge of the fluid and the operating conditions, pressures, temperatures, blade material and manufacturing requirements, as well as experimentation, are necessary to determine the minimum amount of outer tip thickening required.

Thus the set of blades and the sawtooth surfaces on the hub, together with the end plates, form and bound the generally circumferential annular passageway into which fluid may be tangentially vectored by the blades, and on which the fluid-dynamic forces are generated.

The succession of surfaces encountered by the fluid in the annular passageway will continually redirect or vector the flow in the foregoing overall circumferential manner so long as the stream velocity exceeds the velocity of motion of the blades in the tangential direction. Thus even though the blades constitute an actual discontinuous surface, their fluid-vectoring of the faster stream in the annular passageway effectively constitutes them as the outermost fluidic constraining boundary. When the relative velocity reaches zero, the fluid commences to be exhausted by centrifugal force from the annular passageway radially outward, between and constrained by the blades. In its departure from the wheel, the fluid generates its final useful pressure force upon the blades. See $F_8$ in FIG. 3.

Since this zero relative velocity condition can occur anywhere on the wheel periphery except in the fluid entry zone, a turbine wheel designed according to these principles is inherently capable of operating over a broad band of dynamically changing fluid supply and loading conditions.

The present invention may be applied all the way from slow to very fast entering streams. Thus the same basic design is useful over an extremely wide range of turbine speed from low values to very high revolutions per minute when high energy gas is the fluid. Efficient flow passages in the wheel permit energy extraction without excessive choking or clogging, yet no fluid is allowed to leave the wheel until its velocity has been properly reduced. Proper angular positioning of the blades is also extremely important in achieving the maximum torque and the highest speeds as well as smooth operation at all speeds.

Angular change between wheel sectors should be selected to encourage flow in the annular passageway so that energy is extracted by the creation of as many areas of positive and negative pressure as possible. The inclination of the vectoring planar surfaces must be low enough to insure full perimeter traverse at some design speed. For a variable speed wheel, inclination should be low enough to permit the fluid to traverse fully around the annular passageway at maximum entering flow velocity while the wheel is rotating at low speed occasioned by high loading.

On the one hand then, since it is desired to have as many wheel sectors as possible produce useful work, anything which constitutes an obstacle and terminates orderly flow of the full entering stream in the annular passageway should be avoided. The chief offenders are, first, too small a number of blades causing too large an angular change from one sector to the next, and second, too steep an angle of inclination for blade and hub surfaces.

On the other hand, the elimination of major constraints on flow, such as occurs with too deep an annular passageway, does not force the fluid to follow the sawtooth. Such an "open ring" channel around which the fluid freely races does not effectively extract energy from the fluid.

Between these extremes the useful invention lies.

BLADE, HUB AND PASSAGEWAY TERMINOLOGY

Figure 4:
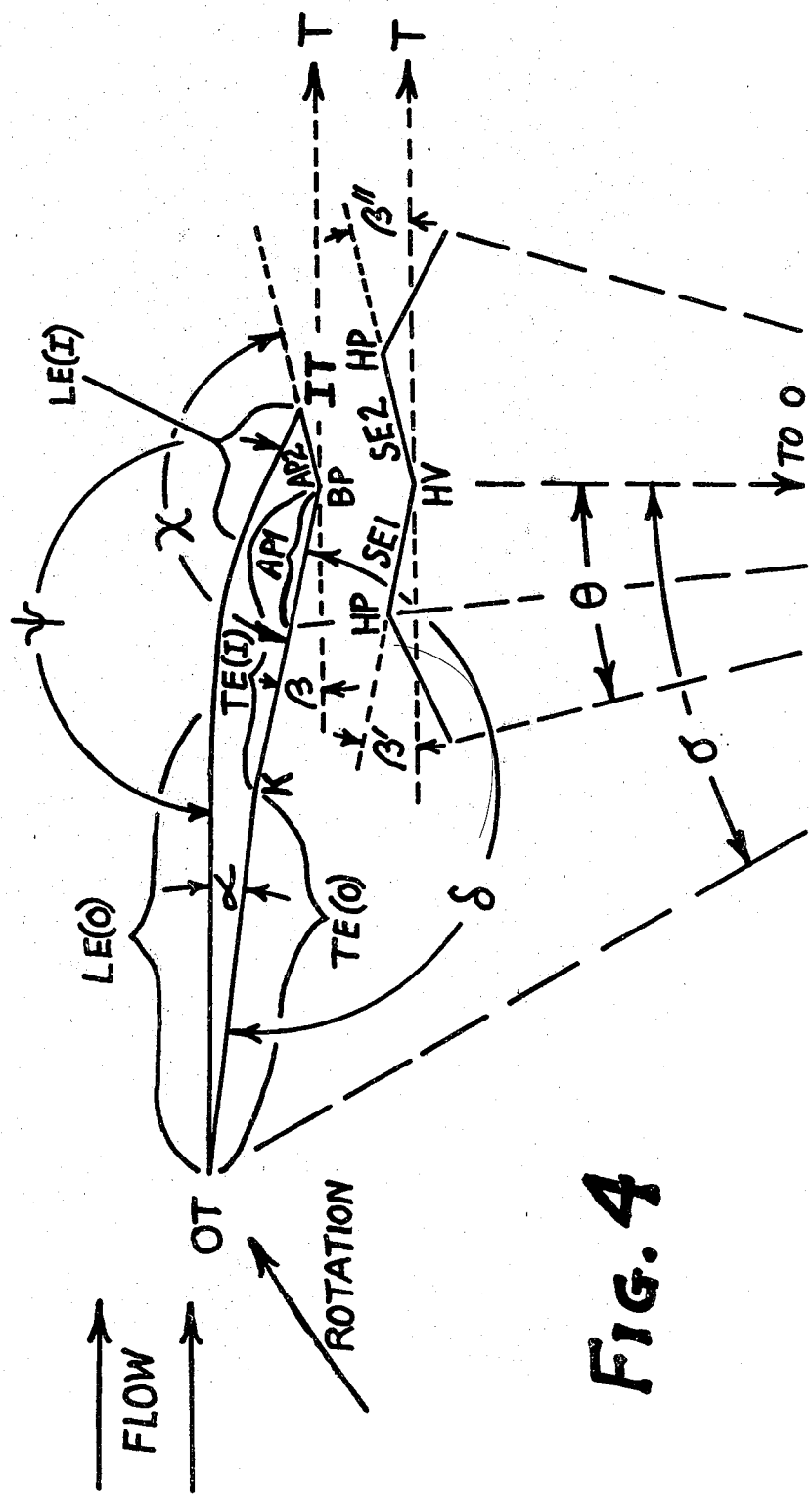
FIG. 4 shows a generalized blade with two symmetrical hub sawteeth oriented to the blade according to the present invention.

FIG. 4 shows a generalized blade with two symmetrical hub sawteeth oriented to the blade according to the present invention. At the instant shown, the top or leading edge is parallel to and just about to rotate into the entering flow. This is the preferred embodiment blade except that trailing edge concavity has been added to demonstrate that feature's definition. Attention is called to the fact that large concavity interrupts the flow and is unacceptable. Sharp edges have not been rounded in order to show the basics of the geometrical generation of blade and hub segments and angles.

The uniform annular passageway portion and the symmetrical sawteeth in the figure result from drawing the inclination angles $\beta$, $\beta'$ and $\beta''$ to be equal. However, they are defined individually in the figure to have the capability of describing a convergent annular passageway and an unsymmetrical sawtooth.

Abbreviations for typical features shown in FIG. 4 are explained in the following nomenclature, which also includes some generally self-explanatory definitions of additional parameters used elsewhere but not shown in FIG. 4.

Rotation direction is that of a turbine wheel.
Flow is tangential and radial inwardly.

Wheel Center
O   See FIGS. 7, 8, 9 and 27.
    Note: Do not confuse this with other uses of the letter "O" meaning "outer".
Hub Points
HP  Hub peak, or the most radially outward point of the hub sawtooth.
HV  Hub valley, or the most radially inward point of the hub sawtooth.

-continued

CP  "Critical point" of the hub sawtooth, or the point of virtual intersection formed by extending SE1 (defined below) from one sawtooth and SE2 (defined below) from the adjacent sawtooth, where the chosen SE1 and SE2 do not share a common hub valley. See FIGS. 8, 9, 10, 15 and 16.

Note on "Edges"
    An edge is the intersection of a blade of hub fluid-vectoring surface with a transverse plane.

Hub Sawtooth Edges
SE1  First sawtooth edge, which is inclined radially inwardly in the flow direction from a hub peak to a hub valley.
SE2  Second sawtooth edge, which is inclined radially outwardly in the flow direction from a hub valley to a hub peak.
$l_H$  Length of a single edge of a symmetrical hub sawtooth. See FIGS. 8, 9 and 26.

Hub Angles
$\beta'$  First sawtooth edge acute angle of inclination, which is measured at the hub valley between the first sawtooth edge SE1 and the tangential direction T.
$\beta''$  Second sawtooth edge acute angle of inclination, which is measured at the hub valley between the second sawtooth edge SE2 and the tangential direction T.
$\theta$  Wheel sector angle, as defined by the central angle spanned by one hub sawtooth from a hub valley to the next adjacent hub valley, or $\frac{360°}{n}$ where n is the number of blades.
$\phi$  Total magnitude of geometrical angular change in an idealized 360 degree passage completely around the hub sawteeth.

Blade Points
OT  Outer tip. See FIG. 4.
IT  Inner tip. See FIG. 4.
BP  Blade peak, which is the intersection between the segments AP1 and AP2 (defined below) of the blade. See FIG. 4.
    Note: The inner tip IT may be coincident with the blade peak BP in some designs. See FIG. 5.
BV  Blade valley, which is the intersection between the flow streamline from the inner tip IT of a blade and the trailing edge (defined below) of the adjacent blade that receives the flow. See FIGS. 9, 25 and 26.
    Note: An idealized blade valley is determined by an idealized geometrical flow, while an actual blade valley is experimentally observed and compared to be sure that impact and unacceptable flow interruption do not occur.
K   Vertex of the angle of concavity $\delta$ in the trailing edge (defined below) of a blade. If the concavity is a smooth curve, the vertex is virtual and inside the blade. See FIG. 5.
    Note: Concavity may not be present. Since concavity must always be gentle to the flow, concavity should be used with caution.
BCP  "Critical point" of the blades, or the point of virtual intersection formed by extending, toward the hub, AP1 (defined below) from one blade and AP2 (defined below) from the adjacent blade, until the extensions intersect radially adjacent to a shared hub peak. If AP2 is not present, BCP is the intersection of the extension of AP1 with the radial through the hub peak adjacent to the extension. See FIGS. 9, 10, 26 and 27.

Blade Edges
LE    Leading edge, or the first edge to encounter the stream flow during rotation of the blade into the entering stream.
LE(O) Outermost segment of the leading edge.
LE(I) Innermost segment of the leading edge.
      Note: There may be an unnamed curved or truncated transition segment between LE(O) and LE(I), selected for fluid flow and blade structure considerations.
TE    Trailing edge.
TE(O) Outermost segment of the trailing edge, which receives the entering stream from the nozzle.
TE(I) Innermost segment of the trailing edge, which also receives the entering stream and guides the stream into the annular passageway in conjunction with the adjacent blade's LE(I).
AP1   First annular passageway segment of the trailing edge, which spans the same central angle as SE1.
      Note: AP1 is included in TE(I). There is never any -continued

| | |
|---|---|
| | concavity in AP1. But TE(I) may include an unnamed straight or very mildly curved transition segment between TE(O) and AP1. |
| AP2 | Second annular passageway segment, which spans only a part of the central angle spanned by SE2 in order to allow a fluid entry opening into the annular passageway. Note: AP2 is not included in TE(I). AP2 may not be present in certain designs, although it is in the preferred embodiment. |
| $l_B$ | Length of an idealized blade with a straight line edge spanning two wheel sectors between the outer tip OT and the blade peak BP. See FIG. 9. |

Blade Angles

| | |
|---|---|
| $\beta$ | Acute angle of inclination, which is measured at the blade peak BP between the first annular passageway segment AP1 and the tangential direction T. |
| $\delta$ | Obtuse angle of concavity, which is measured exterior to the blade between the outermost segment of the trailing edge TE(O) and the first annular passageway segment AP1. |
| $\gamma$ | Acute angle of concavity, as defined by $(180° - \delta)$. |
| $\alpha$ | Acute angle of attack, which is measured interior to the blade between the outermost segments of the leading and trailing edges LE(O) and TE(O). |
| $\psi$ | Reflex angle exterior to the blade between the innermost and outermost segments of the leading edge LE(I) and LE(O). |
| $\chi$ | Obtuse angle interior to the blade between the first and second annular passageway segments AP1 and AP2. Note: $\chi$ and AP2 may not be present in certain designs, although they are in the preferred embodiment. |
| o | Blade entry span, as defined by the central angle spanned by the blade from the outer tip OT to the blade peak BP. Note: The blade span for exiting fluid is the same as the blade span for entering fluid. |
| $\epsilon$ | Blade exit overlap, as defined by $(o - \theta)$. |

Entry Passageway

The innermost segment of the leading edge LE(I) of the blade receiving the entering fluid and the adjacent innermost segment of the trailing edge TE(I) of the neighboring blade define the circumferentially periodic entry passageway openings into the annular passageway.

Entry Passageway Depths

| | |
|---|---|
| s | Depth of entry passageway in the transverse plane, as defined by the perependicular distance from the inner tip IT of a blade to the trailing edge TE of the adjacent blade, which together form the entry passageway. See FIGS. 5, 14, 19 and 22. |
| y | Maximum possible entry passageway depth in the transverse plane, as defined by the perpendicular distance from the blade peak BP of an idealized straight line blade and the adjacent idealized blade. See FIG. 9. |

Annular Passageway

The annular passageway segments AP1 and AP2 of a blade, together with the mating hub sawtooth edges SE1 and SE2, constitute the circumferentially periodic portions of the annular passageway that can be made uniform or convergent.

Annular Passageway Depth

| | |
|---|---|
| d | Depth of the annular passageway in the transverse plane, as defined by the perpendicular distance from the peak BP of a blade to the nearby edges SE1 and SE2 of the hub sawtooth. See FIGS. 5, 9, 14, 19 and 22. |

Uniform Annular Passageway

This phrase refers to the circumferentially periodic portions of the annular passageway which may be made uniform by having AP1 be parallel to SE1 and AP2 be parallel to SE2. This is equivalent to stating that $\beta = \beta'$ and $\chi = 180° - \beta - \beta''$.

Convergent Annular Passageway

Here the convergence is created periodically by narrowing the passageway in the flow direction between AP1 and SE1 and/or between AP2 and SE2, which require respectively that $\beta > \beta'$ and/or $\beta'' > 180° - \beta - \chi$.

Symmetrical Sawtooth

The lengths of SE1 and SE2 are equal when $\beta' = \beta''$.

Uniform Annular Passageway and Symmetrical Sawtooth

When both conditions are imposed $$\beta = \beta' = \beta'' \text{ and } \chi = 180° - 2\beta.$$

Convergent Annular Passageway and Symmetrical Sawtooth

The combined condition becomes $$\beta > \beta' > 180° - \beta - \chi.$$

Radii

| | |
|---|---|
| $r_{JJ}$ | Radial distance from the wheel center O to the generalized subscripted point JJ. Example: $r_{BP}$ is the radius from the wheel center to a blade peak. |

Other Abbreviations

| | |
|---|---|
| PE | Preferred embodiment. |
| L | Approximate lower limit. |
| U | Approximate upper limit. |
| BPPE | Principal embodiment blade peak. |
| BPL | Approximate lower limit of the blade peak. |
| BPU | Approximate upper limit of the blade peak. |

Indicators of Parallelisms and Collinearities

Attention is called to the use on various figures of single, double and triple "hash marks", or groups of short line segments placed crosswise to lines to call attention to their parallelism. Collinearity of isolated line segments is denoted by dotted line extensions connecting the segments. Whenever the reader sees these indicators he should study them in light of the disclosure since they signal key geometrical features.

Figure 5:
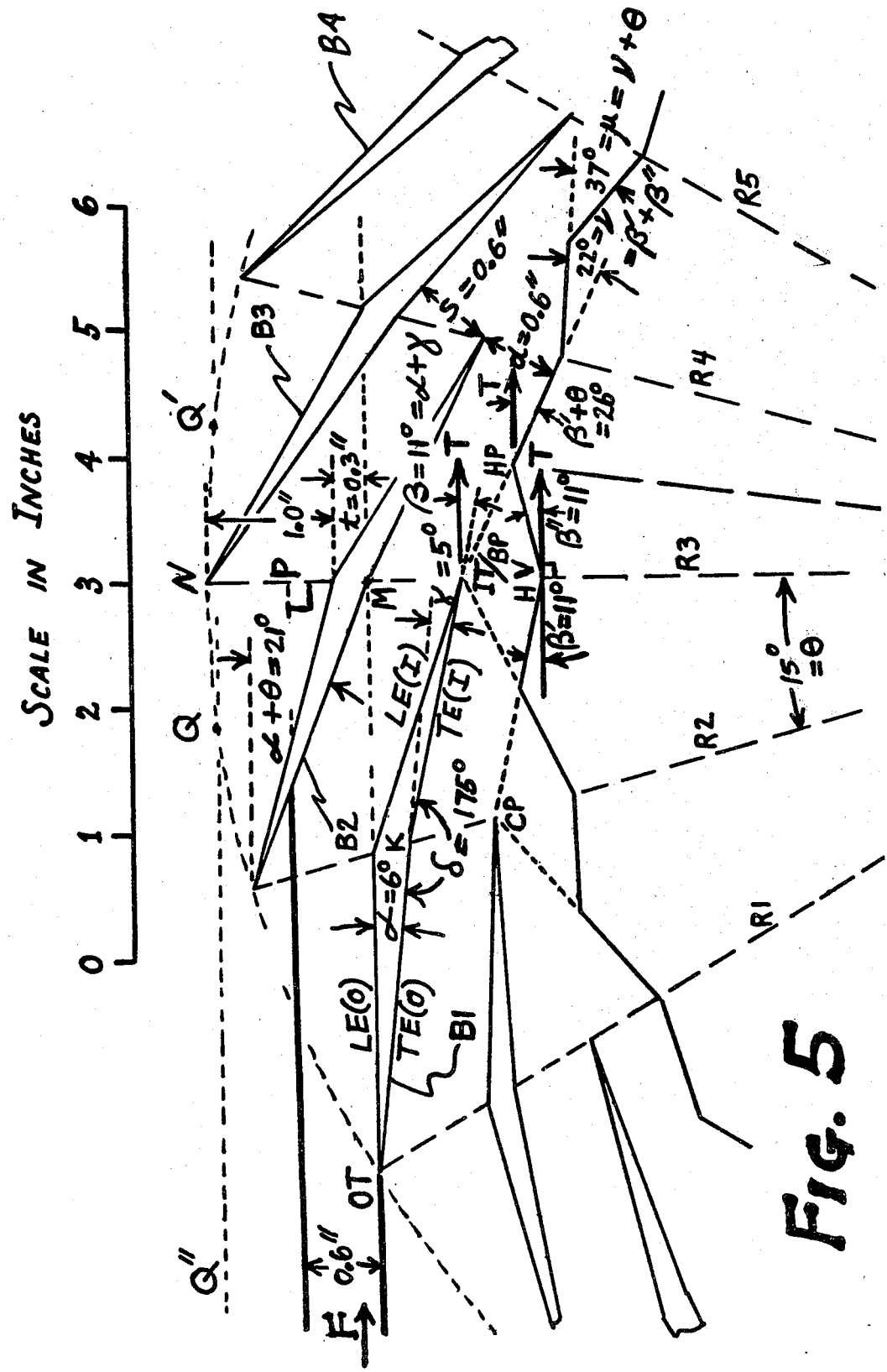
FIG. 5 shows part of an 18 inch diameter wheel featuring three whole blades in cross section.

ILLUSTRATION OF THE OPERATIONAL PRINCIPLE OF TURBINE WHEEL DESIGN n=24 blades was selected to illustrate a specific turbine wheel design. FIG. 5 shows part of an 18" diameter wheel featuring three whole blades in cross section. The turbine axis is off the page at the bottom. Each wheel sector angle $\theta$ is 360/24=15°. The radii to the hub valley HV and the hub peak HP are about 6.5" and 6.75" respectively. The mildly concave blades have been arbitrarily chosen to span two wheel sectors. Although this blade span may be increased to raise the energy delivered by the fluid at exhaust, it should be not less than one wheel sector, for overlapping is important.

Spans greater than about three wheel sectors appear to have diminishing returns.

The chosen location of the blades in relation to the hub results in an annular passageway depth of approximately 0.6". The width of the passageway perpendicular to the plane of the figure can be varied to accomodate greater or lesser volumes of the driving fluid delivered to the passageway by one or more nozzles.

A fluid stream F with a depth of 0.6" generated by a nozzle is directed horizontally into the blades and perpendicular to radial R3 which passes vertically through the turbine axis. The outermost segment LE(O) of the leading edge of blade B1 is parallel to the fluid direction upon entry into the stream, and its dotted continuation line intersects radial R3 at a point M which is 1.3" from the outer circumference of the turbine wheel.

By moving point M in or out on the radial R3 while keeping the hub fixed and maintaining the same inclination angles $\beta = \beta' = \beta'' = 11°$, the length of the blades and the size of the annular passageway between the blades and the fixed inner sawtooth surfaces can be varied. Locating point M farther from the wheel center, while keeping LE(O) collinear with M and perpendicular to R3, results in longer blades and a larger annular passageway. Conversely, when point M is located nearer to the wheel axis, the blades become shorter and the annular passageway smaller.

In this design, the blade inner tip IT is coincident with the blade peak BP since there is no second annular passageway segment. BP has been located radially adjacent to the hub sawtooth valley HV at the virtual intersection of the dotted line extensions of the hub sawtooth edges, which is called the "critical point" CP of the sawtooth. Wheels so designed have relatively deep annular passageways enabling large fluid flows while appearing to retain a streamline flow pattern.

But it should be understood that the annular passageway depth d may be arbitrarily selected so long as the flow vectoring is preserved throughout the annular passageway.

When the size of the annular passageway has been determined, a nozzle can be designed to provide fluid mass flow suited to that size.

The continuation line of the upper boundary of the entering stream intersects radial R3 at point P. Injection of the stream F could be accomplished perpendicular to R3 anywhere in the region between the point M and the outer tip N of blade B3. Raising the stream allows LE(O) to become parallel to the lower boundary of the stream before the blade enters the stream. But point P could be raised to coincide with N only with some periodic tangential fluid loss at the periphery of the wheel as the wheel rotates if it is unshrouded. Thus the practical upper injection boundary line for an unshrouded wheel with incompressible fluid is determined by the points Q and Q' on the outer circumference which are displaced symmetrically $\theta/2$ or 7.5° from radial R3, or halfway between the tips of blade B3 and blades B2 and B4. The allowable entry zone only considering conditions at the turbine wheel periphery thus lies between the tangential direction line Q"QQ' and the lower boundary of the entering stream F as drawn in the figure. However, if the stream is raised to the Q"QQ' line, then blade B3 will be trying to vector the upper half of that relocated stream 15 degrees more than B2 needs to vector the original stream. In some instances, and particularly with low values of n, raising the stream may become intolerable because of the excessive angular charge required.

When the blade length has been established for a particular wheel, the angle of attack $\alpha$ between the outermost segments of the leading and trailing edges LE(O) and TE(O) is determined by the thickness t of the blade required for structural integrity. This thickness is assumed to be 0.3" measured along the median blade radial R3 from point M. This determines $\alpha$ which is approximately 6°. Downstream of point M, further angularity $\gamma$ of approximately 5° has been introduced in the trailing edge of the blade between the outermost and innermost segments TE(0) and TE(I) to coordinate the blade with the hub geometry in a uniform annular passageway. $\gamma$ is complementary to the obtuse angle of blade concavity $\delta = 175°$. This concavity has been located at the median blade radial. The innermost segment LE(I) of the leading edge of the blade runs between the median blade radial R2 intersection with the outermost segment LE(O) and the blade inner tip IT. When the other blades are similarly generated and put into place symmetrically in the wheel, the depth s of the entry passageway between each blade inner tip and the adjacent blade's inner trailing edge is established equal to d to assure equality of entry and annular passageway sizes in this instance. In general, establishment of this sizing relationship between s and d requires knowledge of the desired flows throughout the wheel, i.e., how many nozzles in each entry zone, how many entry zones, where are the fluid exit regions, etc. In this example, it is assumed there is only one entry zone with only one nozzle directed into one wheel sector, so that fluid may exit from every other wheel sector, or $n - 1 = 23$ wheel sectors.

While this example utilizes a uniform annular passageway, periodic convergence could be introduced to achieve reaction effects. The geometrical coordinations between the blades and between the blades and the hub sawteeth then are chosen to provide a pressure drop, but the requirement for preserving streamline flow in the accompanying velocity increase through the narrowing passage remains a paramount consideration.

Returning to FIG. 5, the angular deflection of the fluid stream begins the moment that the outermost segment LE(O) of the leading edge of each blade enters the lower boundary of the fluid stream. Initial deflection is of angle $\alpha$, which is approximately 6°, and progresses to angle $\alpha + \theta$ for the full stream, which is approximately $6° + 15° = 21°$. The angular behavior of the fluid stream after this point is subject to a Coanda effect as the leading edge enters the stream and probably does not become much greater than the 21° angular change which occurs as one blade enters the stream and the preceding blade continues to depart from the stream. Angular flow is further changed by angle $\gamma$ or approximately 5° as the flow passes the concavity at the median blade radial intersection K.

As the flow proceeds into and around the annular passageway of a wheel blocked from turning, the angular change in direction as the fluid is vectored radially outwardly by the hub sawtooth is approximately $\nu = \beta' + \beta'' = 22°$. The angular deflection of the fluid as it is vectored radially inwardly by the innermost segment TE(I) of the trailing edge of each blade in concert with the mating and parallel sawtooth edge is approximately $\mu = \nu + \theta = 37°$. These significant angles are illustrated between radii R4 and R5 in FIG. 5.

If we now add the 15 degree increase occasioned by raising the entering stream to the line Q"QQ' and the resulting shift in vectoring from blade B2 to blade B3, to the 21 degree angular change which occurs as one blade enters the stream as the preceding blade departs, we have a total of 36 degrees. This is essentially equal to the angle $\mu$, so in this instance raising the stream does not cause an excessive angular change beyond anything demanded by the hub sawtooth itself.

When the fluid is in the annular passageway, there is approximately $\nu + \mu = 22° + 37° = 59°$ total magnitude of change in direction of the fluid as it passes through each 15° wheel sector of the blocked turbine wheel, or around 1,300° total magnitude of change in direction for a fluid retention condition that encompasses nearly the entire annular passageway.

As the fluid progresses through each wheel sector, directional change plus friction reduced the flow velocity. At some point in the annular passageway, depending upon the entering stream velocity, the turbine loading, and the speed of wheel rotation, the fluid flow relative to the moving wheel will become zero. At this point, the fluid will advance no further circumferentially in the annular passageway, and will be exhausted radially between the blades by centrifugal force. As the fluid exhausts, the centrifugal component of the flow will create a positive force on the trailing edge of the blade that overlaps the region of ejection or exhaust. Blade concavity may aid in this final energy extraction, as it allows a longer blade for the same diameter wheel.

In FIG. 5, directional change in the leading and trailing blade edges are shown as sharp angles to illustrate the manner in which the basic blade shape is developed. In actual practice, these angles may be rounded to facilitate flow or strengthen the blade. In like manner, the sawtooth edges are shown with sharp intersections for purposes of illustration, and may be similarly rounded.

JUDGMENTAL AND EXPERIMENTAL CONSIDERATIONS

In building a turbine wheel according to the present invention, first consideration must be given to the characteristics of the entering stream. The wheel can be arranged to operate in any orientation of rotation.

If the fluid is compressible and not completely expanded in the nozzle to atmospheric pressure, the wheel should be shrouded with each exit port separated as far as possible in the direction of rotation on the periphery from the corresponding nozzle. Shrouds are not necessary if complete expansion occurs in the nozzle, although shields may be needed to guard the wheel, or prevent fluid entry from unwanted directions, as in a wind turbine.

Incompressible fluids require shielding only to control splashing or to guard the wheel.

From the principles of mechanics, the required cross-section of the annular passageway, which must carry the entire stream, can be estimated.

General considerations discovered by the inventor that enable others to similarly practice the invention will next be discussed.

The number of blades and the resulting doubled number of polyhedral sawtooth surfaces are best regarded as factors of judgment that also depend in a practical sense upon the chosen wheel diameter and the mass, density, and velocity of the fluid. While the fundamental principle of operation is independent of the number of blades, there will be an optimization of this variable in a given situation in which experience is as important as analysis.

In fact, many details of the turbine wheel are best settled by experiment and observation of an actual wheel cross-section in action.

Figure 6:
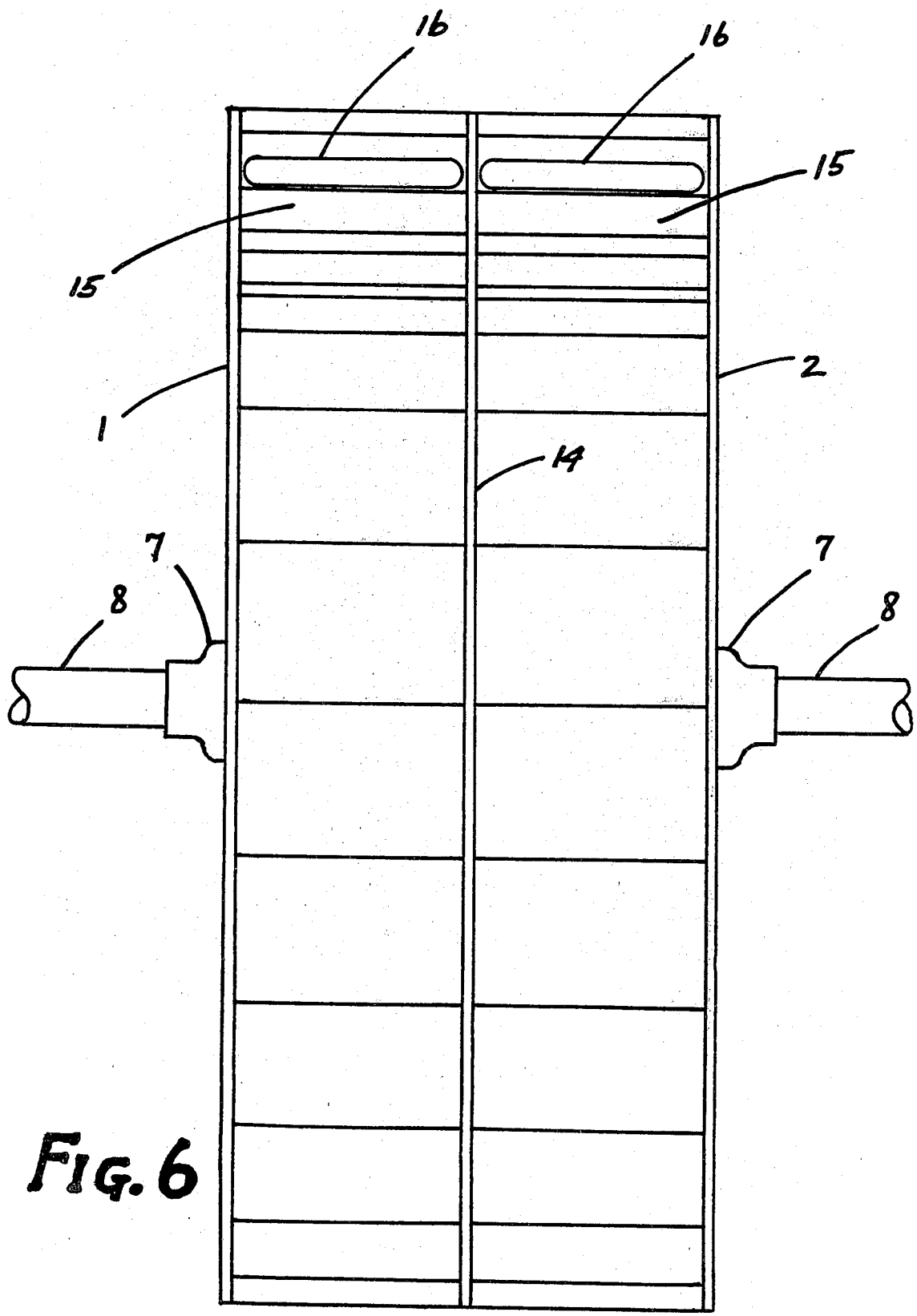
FIGS. 6 and 24 show alternate embodiments of the turbine wheel of the present invention.

A key advantage of the invention is the ease with which a narrow-width experimental design can, once tested, be modified if necessary, and thus proved, then be widened with minimal risk to accomodate the full operational stream. Intermediate concentric plates may be placed on the hub as required to support the span of the long blade beams, which might otherwise bend unduly if only supported at their ends. The wheel of FIGS. 1 and 2 can readily be enlarged by widening the distance between the sides 1 and 2 as shown in FIG. 6, where an intermediate transverse plate 14 supports the center of the long blade beams, of which 15 is typical. Wider nozzles 16 are now used. Thus a verified cross-sectional design is readily extended to higher power output ratings for exactly the same speed range tested, since the cross-sectional conditions are unaffected in longitudinal enlargement.

In the laboratory, a narrow-width experimental turbine can be easily fitted with transparent sides or windows to display all of the interior stream flow phenomena over the blade and hub surfaces, for ready viewing, and for stroboscopic observation and flash photography in conjunction with dynamometer measurements. Due to symmetry of the wheel and internal flows, as well as the lack of longitudinal forces, the wheel should be easily balanced and vibration free, and require only simple non-thrust bearings selected for the wheel speeds desired.

A key test requires blocking of the turbine wheel to prevent rotation while the stream is injected so that the efficiency of fluid injection into the annular passageway, and the efficacy of the fluid-vectoring actions in the annular passageway to deliver high torque can be verified with the stream occupying essentially the entire passageway. Dye or smoke injection can display streamlines of the flow.

It is essential that the entry of the fluid into the wheel be smooth. Observations of the nozzle action, the efficiency of the multiple staging by means of carefully noting the successive stream contacts by the alternating blade and hub surfaces, and the centrifugal exhaust action are very important. If each proper successive contacts are not obtained, rounding of sharp and abruptly angled surfaces should be undertaken. Point-by-point conscientious application to common-sense study of the details of an irregular flow pattern, which could, for example, skip a blade randomly or otherwise scatter about, may reveal deficiencies of judgment in choosing blade and hub inclination angles with respect to the velocities involved. Some cut-and-try procedures for selecting numbers, dimensions and component orientations must be used in an individual case, and particularly to optimize a result or push an operating range to extremes. Realization that in each situation that the principle of operation remains the same is the key to such experimental performance optimization.

In observing, one should note where the stream begins to fill the annular passageway. A circular cross-section nozzle may not immediately fill a rectangular cross-section passageway. For example, with some blade arrangements, skipping may occur early in the sequence of vectoring only because the passageway is not full in a high initial stream velocity region. But as the stream progresses around the annular passageway, the slower boundary layers on the blade and the hub surfaces exhaust first. Then the stream builds up pressure and tends to choke as its main body slows down prior to exhaust.

For maximum efficiency, an ideal stream should change direction smoothly each time it comes in contact with or passes by a blade or a hub surface. The design objective should be to achieve the maximum angular change in stream direction without generating excessive turbulence or choked flow within the annular passageway. This can be accomplished by increasing the inclination of the vectoring surfaces, and by increasing the number of blades n and the corresponding number 2n of hub sawtooth faces. A point will be reached where turbulence, choke, or shock make further increases no longer feasible. The increase in wheel diameter required to maintain a reasonable blade size as n is raised also exerts an important limitation.

The experimental narrow-width turbine wheel can be run over the entire desired operating speed range under proportionately smaller loading. In this way, there is never any need to build a high-capacity full-width design of unproved cross section.

PRINCIPLES OF IDEALIZED DESIGN

Although some energy is extracted from the fluid as it is vectored into and as it exits from the annular passageway, most of the energy extraction normally occurs within the annular passageway itself. The choice of the annular passageway's sawtooth becomes the cornerstone of wheel design. The main design endeavor is to come as close a possible to having the fluid follow the sawtooth exactly at whatever velocities are involved.

Figure 7:
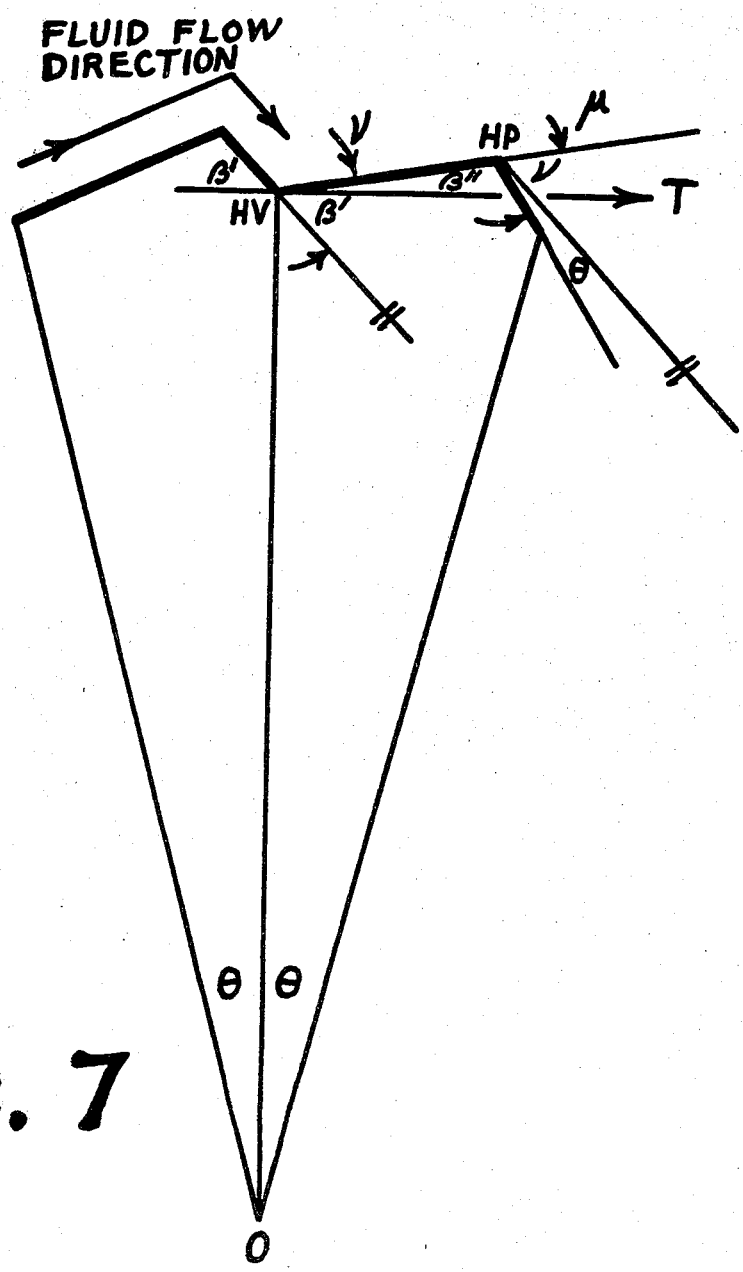
FIG. 7 shows two triangular wheel sectors of central angle $\theta$.

FIG. 7 shows two triangular wheel sectors of central angle $\theta$, with each carrying an unsymmetrical sawtooth defined at the common hub valley HV by inclination angles $\beta'$ and $\beta''$ with respect to the tangential direction T. Assuming streamline flow conditions in a stationary wheel that is blocked from turning while fluid is being injected, the total magnitude of geometrical angular change $\phi$ experienced by a perfect fluid exactly following the n sawteeth in an idealized 360 degree passage completely around the wheel's annular passageway neglecting entry and exit is given by $$\phi = n(\mu + \nu)$$

where
$\nu = \beta' + \beta'' =$ angular change at hub valley HV $\mu = \nu + \theta =$ angular change at hub peak HP and $$\theta = 360°/n$$

so $$\phi = 2n(\beta' + \beta'') + 360°$$

The use of a symmetrical sawtooth is recommended for ease of manufacture, making $$\beta' = \beta'' \text{ and } \phi = 4n\beta' + 360°.$$

Although the designer may regard the product $n\beta'$ as a theoretical figure of merit independent of wheel size when comparing turbine wheels according to the present invention, he must achieve essentially streamline flow over the hub angular changes $\mu$ and $\nu$ for it to be meaningful. Note that $\mu \rightarrow \nu$ only as $n \rightarrow \infty$, so equalization of the hub valley and hub peak angular changes, which is desirable, can only be done by using a large number of blades and not by any unsymmetrical sawtooth arrangement. No general advantage has been discovered for an unsymmetrical sawtooth except where it aids the design of the periodic convergence of the annular passageway in a reaction wheel.

When too small a number of blades n or too steep a hub inclination $\beta'$ is used, the annular passageway flow impacts the blade surfaces at too large an angle $\mu$, and the resulting shock destroys streamline conditions.

Figure 9:
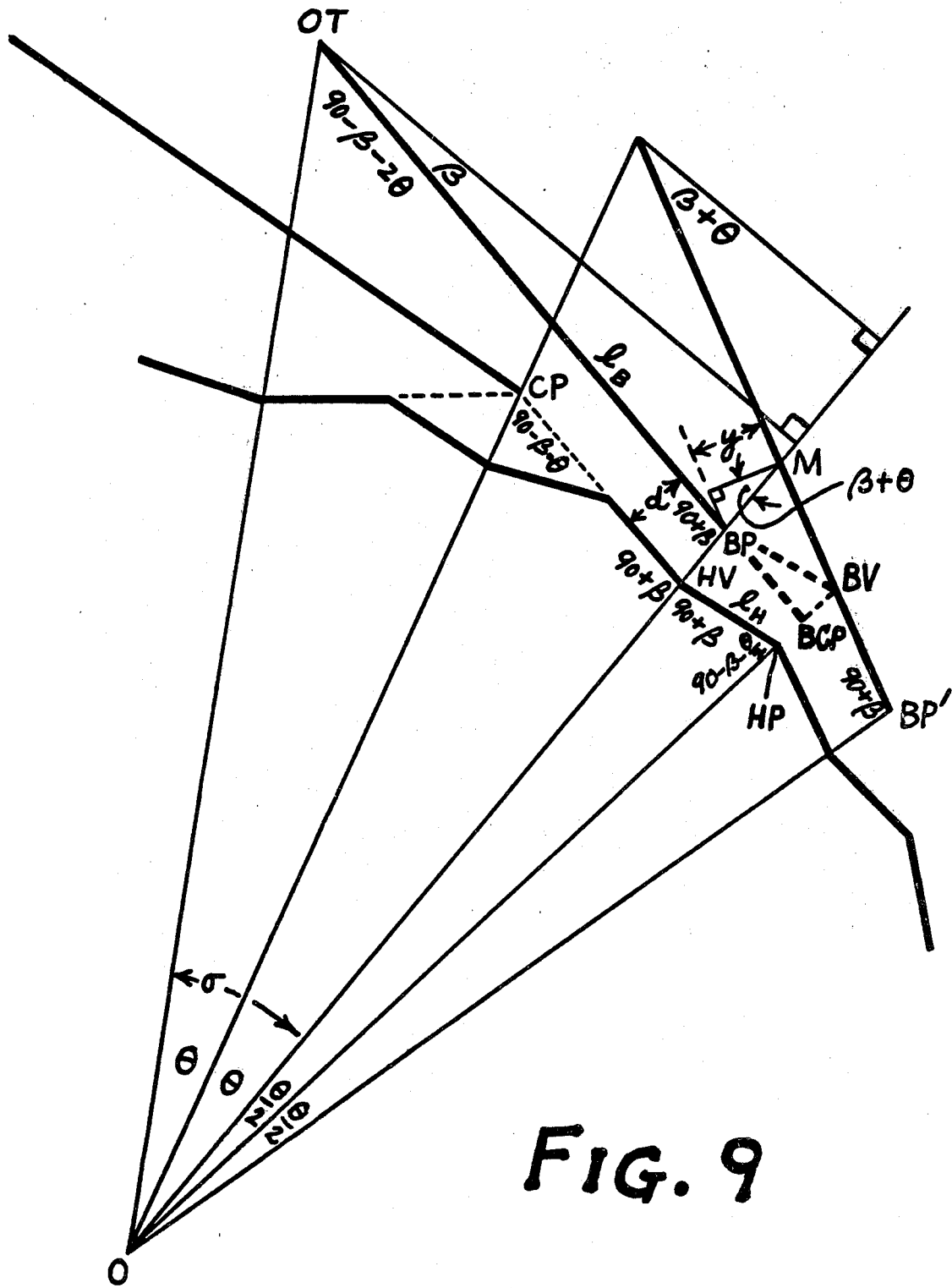
FIG. 9 depicts an idealization of a straight line blade having neither concavity or thickness.

The effect of a uniform annular passageway may be visualized by considering an idealized incompressible flow to be trapped in an imaginary closed channel between the hub and an outer "blade sawtooth" surface. The blade sawtooth is exactly parallel to the hub sawtooth, with "blade valleys", as described from a perspective outside the wheel, radially adjacent to the hub peaks. FIG. 9 shows one idealized blade valley point BV, located on the right-hand idealized blade. A dotted line segment from BP on each blade to BV on the adjacent receiving blade completes a parallelogram section HV-BP-BV-HP of the idealized closed double sawtooth annular passageway. These segments BP-BV thus "close" the entry passageways into the wheel.

Such idealizations can be compared with the actual blade valleys and fluid flow observed experimentally with the transparent side wheel already described. Distortions in the observed flow segment BP (or IT) to BV should be minimized. Observations for various speeds and loadings give clues for parameter improvement.

The ratio of the symmetrical sawtooth edge length $l_H$ to the perpendicularly define depth d of the annular passageway channel portions, or $k = l_H/d$, is seen to be an intuitively significant figure of merit in achieving sawtooth angular change by the fluid through imposing the constraint of adequate channel length in each portion. Severe deterioration in streamline flow and inability of the fluid to follow the hub angular changes occur for values of k that are too low. With too low k, the hub and blade geometries will appear to be less coordinated when contrasted with tighter designs. Experimentation is important to this determination, as the question of whether the fluid can follow the hub contours is intimately related to the character and velocity of the fluid as well as the depth of the annular passageway.

While the annular passageway should be as deep as possible to increase flow capacity for a given wheel diameter, yet not be so deep as to lose vectoring effectiveness, the inventor has discovered approximate upper and lower bounds within which so many useful high speed wheels appear to lie as to be worthy of consideration by the designer.

Figure 8:
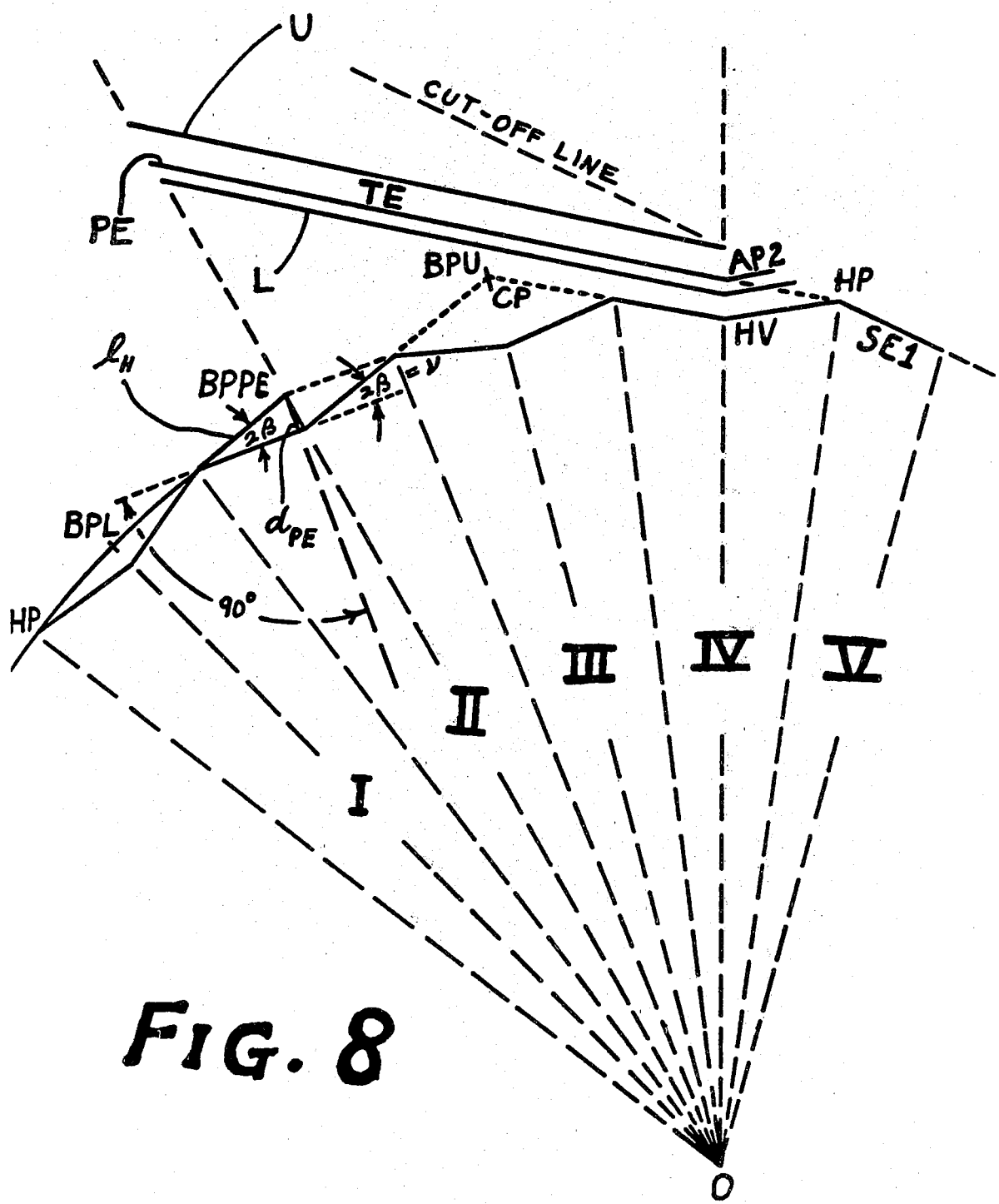
FIG. 8 illustrates the drafting of the flat trailing edge TE with no concavity.

First, there appears to be no intrinsic advantage to locating the blade peaks any closer to the wheel center than the hub peaks, which may be taken as an approximate lower bound for an economical annular passageway size, or $r_{BPL} \approx r_{HP}$, as shown in Sector I of FIG. 8 for a symmetrical sawtooth. Note the corresponding blade edge L, which is mated to the hub in Sector IV.

Second, the corresponding practical approximate upper bound for reasonable angular change performance is found by extending the hub sawtooth edges to their virtual intersections, or sawtooth "critical point" CP, so $r_{BPU} \approx r_{CP}$, as illustrated in Sector III of FIG. 8.

Also see the corresponding blade edge U mated to the hub in Sector IV.

Although $r_{HP} \lesssim r_{BP} \lesssim r_{CP}$ appears to be a useful rough design guide to the working range of blade peak locations for high speed wheels, it must be recognized that satisfactory wheels for certain purposes may well lie outside these boundaries.

IDEALIZED WHEEL SCALING

Turbine wheel size may be roughly estimated by considering a straight line blade having neither concavity nor thickness, rather than the real fluid-dynamic shape. In FIG. 9 such an idealization is drawn for the following additional assumptions:

1. The sawtooth is symmetrical and the blade is rendered parallel to the appropriate sawtooth edge, so $\beta = \beta' = \beta''$, making uniform annular passageway portions.
2. The entry passageway between the idealized blades is naturally convergent.
3. The peripheral radius of the wheel is taken to the blade outer tip, or $r_{OT}$.
4. The central angle span of the blade from the outer tip OT to the blade peak BP is taken as two wheel sectors, or $\sigma = 2\theta$. The blade overlap $\epsilon = \sigma - \theta = \theta$ becomes one wheel sector. The inventor believes that this amount of overlap is generally a good compromise for high speed turbine wheels. However, in the case of low speed wheels, such as wind turbines, the longest overlapping blade that one can afford mechanically and economically will aid in energy extraction from the slow-moving centrifugally-exiting air.

Application in FIG. 9 of the law of sines and the equivalency of sines and cosines give the following relations for blade triangle OT, BP, O:

$$\frac{r_{OT}}{\cos \beta} = \frac{r_{BP}}{\cos (\beta + 2\theta)} = \frac{l_B}{\sin 2\theta} \quad (1)$$

Selection of the number of blades and the blade inclination fixes the dimensionless ratios between $r_{OT}$, $r_{BP}$ and $l_B$.

Similarly for hub triangle HP, HV, O we have:

$$\frac{r_{HP}}{\cos \beta} = \frac{r_{HV}}{\cos \left(\beta + \frac{\theta}{2}\right)} = \frac{l_H}{\sin \frac{\theta}{2}} \quad (2)$$

Again, the choice of the number of blades and the blade inclination similarly fixes the dimensionless ratios between $r_{HP}$, $r_{HV}$ and $l_H$.

The choice of a depth d of the annular passageway in the form of a third equation effectively links by ratio some length in equation (1) to some second length in equation (2) and completes the idealized turbine dimensionless ratio design. A drawing of the idealized turbine wheel can be made and the scale altered as required. The real blades can then be drawn in place.

In other words, the final choice of a specific length for only one parameter selected from the list $r_{OT}$, $r_{BP}$, $r_{HP}$, $r_{HV}$, $l_B$, $l_H$, or d completely sizes the turbine wheel.

Although FIG. 9 is executed for the approximate upper bound condition, formulas (1) and (2) have general validity.

For an arbitrary annular passageway depth d, FIG. 9 shows $$d = (r_{BP} - r_{HV}) \cos \beta.$$

DIMENSIONLESS RATIOS FOR THE APPROXIMATE LOWER BOUND

We now consider the approximate lower bound on annular passageway depth $d_L$, where $r_{BP} = r_{HP}$ so $d_L \approx (r_{HP} - r_{HV}) \cos \beta$ and use equations (2) and (1) to determine the following dimensionless ratios:

$$\frac{d_L}{r_{BP}} = \frac{d_L}{r_{HP}} = \cos \beta - \cos \left(\beta + \frac{\theta}{2}\right)$$

$$\frac{d_L}{r_{HV}} = \frac{\cos \beta}{\cos \left(\beta + \frac{\theta}{2}\right)} \frac{d_L}{r_{HP}}$$

$$\frac{d_L}{l_H} = \frac{\cos \beta}{\sin \frac{\theta}{2}} \frac{d_L}{r_{HP}}$$

$$\frac{d_L}{r_{OT}} = \frac{\cos (\beta + 2\theta)}{\cos \beta} \frac{d_L}{r_{HP}}$$

$$\frac{d_L}{l_B} = \frac{\cos (\beta + 2\theta)}{\sin 2\theta} \frac{d_L}{r_{HP}}.$$

DIMENSIONLESS RATIOS FOR THE APPROXIMATE UPPER BOUND

We next consider the rough upper bound on annular passageway depth $d_U$, where the triangle in FIG. 9 defining the location of the blade peak BP at the "critical point" CP, HV, O gives $$r_{BP} = r_{CP}$$

$$\frac{r_{CP}}{\cos \beta} = \frac{r_{HV}}{\cos (\beta + \theta)}$$

$$d_U \approx (r_{CP} - r_{HV}) \cos \beta$$

$$\approx r_{HV} \left[\frac{\cos \beta}{\cos (\beta + \theta)} - 1\right] \cos \beta$$

and $$\frac{d_U}{r_{HV}} = \frac{\cos^2 \beta}{\cos (\beta + \theta)} - \cos \beta$$

$$\frac{d_U}{r_{HP}} = \frac{\cos \left(\beta + \frac{\theta}{2}\right)}{\cos \beta} \frac{d_U}{r_{HV}}$$

$$\frac{d_U}{l_H} = \frac{\cos \left(\beta + \frac{\theta}{2}\right)}{\sin \frac{\theta}{2}} \frac{d_U}{r_{HV}}$$

$$\frac{d_U}{r_{BP}} = \frac{\cos (\beta + \theta)}{\cos \beta} \frac{d_U}{r_{HV}}$$

$$\frac{d_U}{r_{OT}} = \frac{\cos (\beta + 2\theta)}{\cos \beta} \frac{d_U}{r_{BP}}$$

$$\frac{d_U}{l_B} = \frac{\cos (\beta + 2\theta)}{\sin 2\theta} \frac{d_U}{r_{BP}}.$$

PREFERRED EMBODIMENT IDEALIZATION

Between the approximate lower and upper bounds lies the annular passageway of the preferred embodiment. Each straight line idealized blade is aimed at a hub peak yet rendered parallel to the appropriate hub sawtooth edge to produce a uniform annular passageway. See the PE edge in Sector IV of FIG. 8. This is equivalent to erecting a parallelogram over a hub valley to generate the preferred embodiment blade peak BPPE, as shown in Sector II of FIG. 8. The marked right triangle also in Sector II of FIG. 8 illustrates that the defining equation is simply $$d_{PE}/l_H = \sin 2\beta.$$

The annular passageway depth set by this equation will be used with real blades also. The idealized straight line blade becomes the trailing edge TE of the real flat blade.

Using equations (2) and (1):

$$\frac{d_{PE}}{r_{HP}} = \frac{\sin \frac{\theta}{2}}{\cos \beta} \frac{d_{PE}}{l_H}$$

$$\frac{d_{PE}}{r_{HV}} = \frac{\sin \frac{\theta}{2}}{\cos \left(\beta + \frac{\theta}{2}\right)} \frac{d_{PE}}{l_H}$$

$$\frac{d_{PE}}{r_{BP}} = \frac{\sin \frac{\theta}{2}}{\cos \left(\beta + \frac{\theta}{2}\right) + 2 \sin \beta \sin \frac{\theta}{2}} \frac{d_{PE}}{l_H}$$

$$\frac{d_{PE}}{r_{OT}} = \frac{\cos (\beta + 2\theta)}{\cos \beta} \frac{d_{PE}}{r_{BP}}$$

$$\frac{d_{PE}}{l_B} = \frac{\cos (\beta + 2\theta)}{\sin 2\theta} \frac{d_{PE}}{r_{BP}}.$$

PASSAGEWAY DEPTH

Sector IV of FIG. 8 illustrates the drafting of the flat trailing edge TE with no concavity and the adjoining second annular passageway segment AP2 for a uniform passageway under the condition that the entry passageway not be smaller than the annular passageway. Thus the second annular passageway segments must terminate along a cut-off line which is the extension of the hub sawtooth edge SE1 next in line in Sector V. Sector IV illustrates cut-off for the approximate lower limit blade L, the preferred embodiment blade PE, and the approximate upper limit blade U. In this sequence the passageway depth increases progressively until the second annular passageway segment AP2 (shown between HV and HP in Sector IV) vanishes with U.

Note carefully that this vanishing occurs under the condition that the entry and annular passageways are equal in depth.

Figure 10:
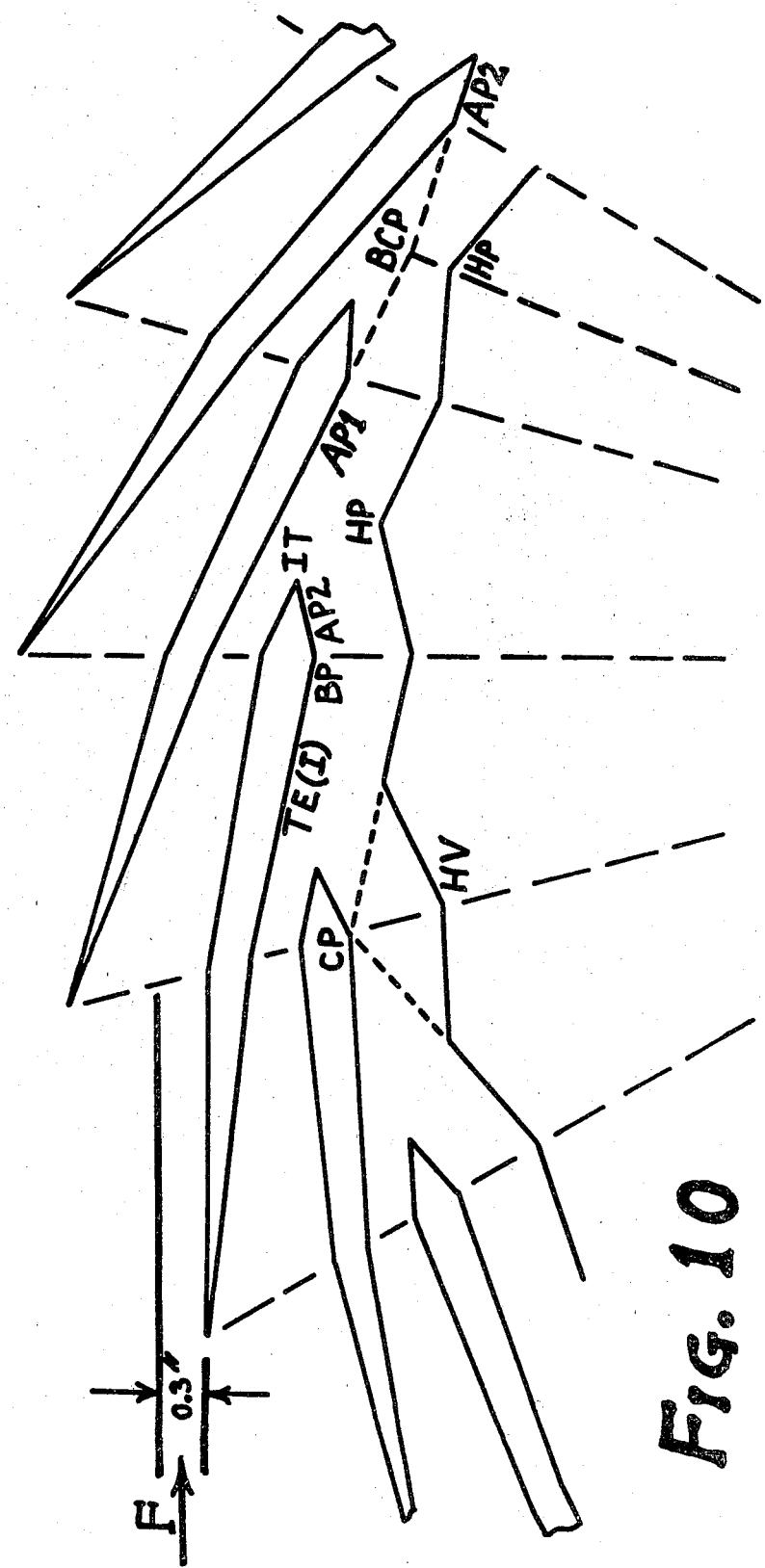
FIG. 10 illustrates the identical basic design of FIG. 5, except that the entry stream has been reduced to half depth.

Such a situation has already been presented in the turbine wheel of FIG. 5, which should now be compared with FIG. 10. The latter figure illustrates the identical basic design of FIG. 5 except that the entry stream has been reduced to half depth, or 0.3″ only. This allows an appreciable length to be assigned to the second annular passageway segment AP2. Study of FIG. 3 at this point calls attention again to the important advantage conferred by the existence of the lift forces on the blades accompanying a non-zero AP2. For this and other reasons, a finite AP2 is used in the preferred embodiment blade.

Another advantage of a non-zero AP2 is the improved fluid-vectoring control it renders by moving the inner tip IT out of coincidence with the blade peak BP, and closer to the innermost segment of the trailing edge TE(I) of the neighboring blade. The constraint of the annular passageway is tightened as the arrangement becomes closer to the idealized parallel double sawtooth closed annular passageway.

Proper utilization of the wheel of FIG. 10 requires simply that two nozzles be used. This could be done in adjacent sectors similarly to FIG. 19, which for contrast shows a flat blade.

Alternatively, the nozzles might be located in two entry zones 180 degrees apart. Thus injection from each nozzle might be accompanied by a "piston effect" of injecting faster new fluid on top of already trapped fluid, unless the wheel were arranged to exhaust completely in 180 degrees. Experimentation with a particular wheel at the desired speeds and loading can readily settle the question of which arrangement is best.

Any reasonable number of nozzles may be used with an equivalent ratio of the depths of the annular and entry passageways.

The important point is that there are generally a multiplicity of entry and exit zones that could be arranged on a large wheel, perhaps with differing efficiencies, and all for the same basic wheel design. The choice of the mode of utilization of a given wheel, or the selection of entry and exit zones and conditions, is as important to the end result as the wheel design itself.

Figure 11:
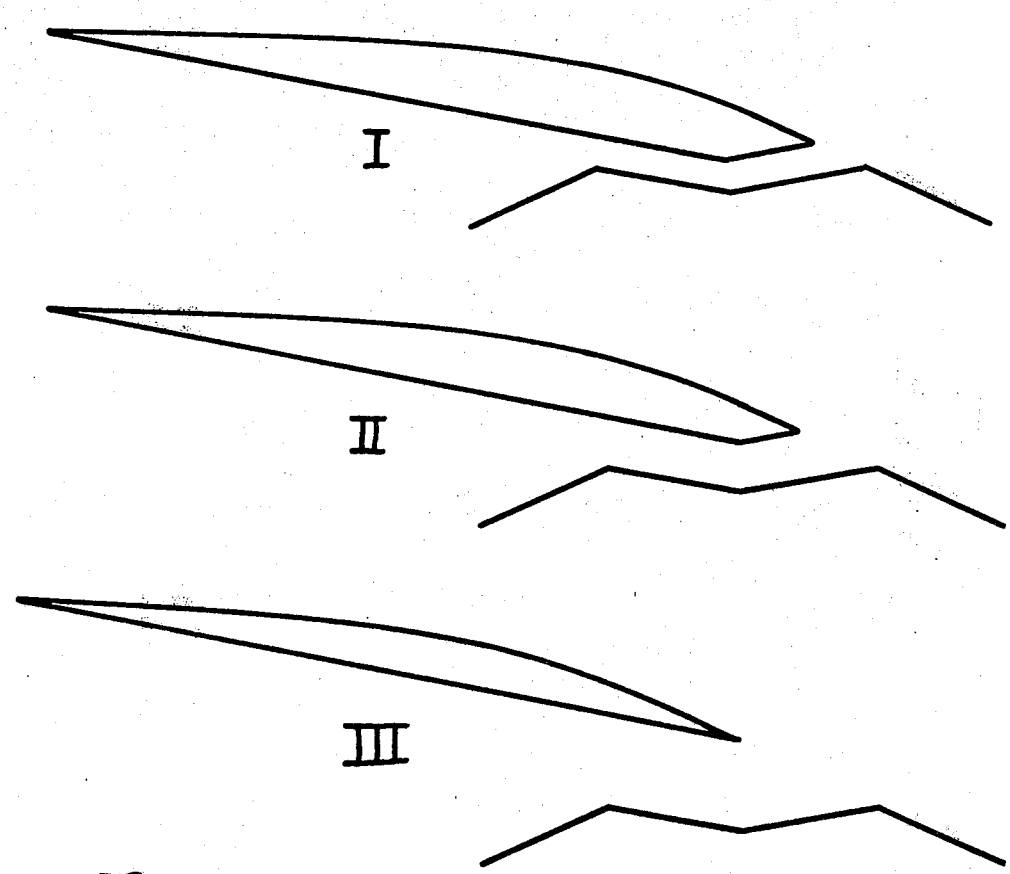
FIG. 11 depicts the orientation to the hub of three flat blades with rounded leading edge transition sectors.

FIG. 11 depicts the orientation to the hub of three flat blades with rounded leading edge transition sections, for the same basic hub conditions as FIG. 4, but under the identical sector conditions already described in connection with FIG. 8. Thus I is a blade for an approximate lower bound passageway depth, II is the preferred embodiment blade and passageway depth, while III is a blade for the approximate upper bound passageway depth, all on the condition that the entry and annular passageways are equal, or d=s.

IDEALIZED ENTRY PASSAGEWAY DEPTH

Referring again to FIG. 9, we now calculate the idealized maximum possible entry passageway depth y for a given turbine wheel radius to the blade outer tips $r_{OT}$, or the quantity $y/r_{OT}$. From the small triangle involving y we have $$y = (r_M - r_{BP}) \cos (\beta + \theta)$$

Applying the law of sines and trigonometric substitutions to triangle O, M, BP′

$$\frac{r_M}{r_{BP}} = \frac{\cos \beta}{\cos (\beta + \theta)}$$

$$\frac{r_M - r_{BP}}{r_{BP}} = \frac{\cos \beta}{\cos (\beta + \theta)} - 1$$

$$\frac{y}{r_{BP}} = \cos \beta - \cos (\beta + \theta).$$

Using equation (1):

-continued $$\frac{y}{r_{OT}} = \cos(\beta + 2\theta)\left[1 - \frac{\cos(\beta + \theta)}{\cos\beta}\right].$$

In other words, the depth of the entry passageway s is bounded by $$y \geq s > 0$$

When $y = s$, the blade inner tip IT and the blade peak BP are coincident. If $s < y$, then a finite annular passageway segment AP2 exists, at least as a design possibility.

FLUID ENTRY INTO THE ANNULAR PASSAGEWAY

Unless the fluid entering the turbine wheel is guided efficiently into the annular passageway, the effectiveness of the annular passageway itself is impaired, although the coordinated geometry within the annular passageway will actually try to effect some restoration of streamline flow conditions, if it is properly designed.

In positioning the blades on the outer circumferential periphery of the wheel, it is necessary for the greatest effectiveness to have the blade that is next in line at the entry zone rotate efficiently into the fluid streaming from the nozzle. The blade entry should not generate any reverse torque, however briefly it may occur, or cause excessive fluid splatter. Best entry is found to be achieved when the outermost segment of the leading edge LE(O) of this blade becomes parallel to the first-encountered boundary of the entering stream at or immediately prior to the instant that the blade contacts the stream. Later timing of blade entry causes inefficiency and vibration.

The recommended design method commences with the hub layout and proceeds outward through the blades to the periphery and the fluid injection. It is also possible to begin with the entering stream, and working inward, arrive at the hub as the last step.

In either procedure, the designer should examine the flow of the entering stream with respect to the location of a prominence, such as a blade inner tip or a hub peak. Making a prominence be collinear with an associated flow-guiding hub or blade edge is a means of minimizing turbulences generated by protrusions into the stream flow. The designer should also consider whether the associated flow-guiding hub and blade edges might additionally be made either parallel or collinear. Factors to be considered include, whether the wheel is to be uniform or convergent in the annular passageway portions, and the relative sizes of the entry and annular passageways.

Such design choices, together with the radial adjacency of blade peaks and hub valleys, determine the coordination that binds the hub to the blades and creates streamline flow.

This inventor has discovered several specific geometrical arrangements which consummate the objects of the invention for real non-idealized blades and contribute greatly to the efficiency of the fluid flows entering the annular passageway under various circumstances. These involve relationships between elements of the blades that guide the entering fluid and the hub sawteeth that receive the fluid. They constitute a mixed array of both compatible and alternative choices available to the wheel designer, who most call on his judgment to select for a particular application.

Since the entry passageway is also the exit passageway, the creation of reasonable entry conditions appears to satisfy exit requirements, for no separate exit problems have arisen.

In turbine wheels according to the present invention there is a natural tendency toward convergence of the passageway between any adjacent pair of blades, looking from the periphery toward the wheel hub. The final portion, or the entry passageway into the annular passageway, lies between the outermost segment of the trailing edge TE(O) of the receiving blade and the innermost segment of the leading edge LE(I) of the neighboring blade. This entry passageway can be made convergent or uniform in the flow direction by appropriately orienting the aforementioned elements non-parallel or parallel respectively. Close attention must be given to the smoothness of the entry flow actually achieved in practice: shock, eddys, turbulence, splatter and anything which detracts from streamline flow conditions should be eliminated or minimized.

We shall now consider four possible alternative orientations of the entry passageway, which involve specific geometrical alignments of various elements of the passageway.

1. HP-LE(I) Collinearity

Figure 12:
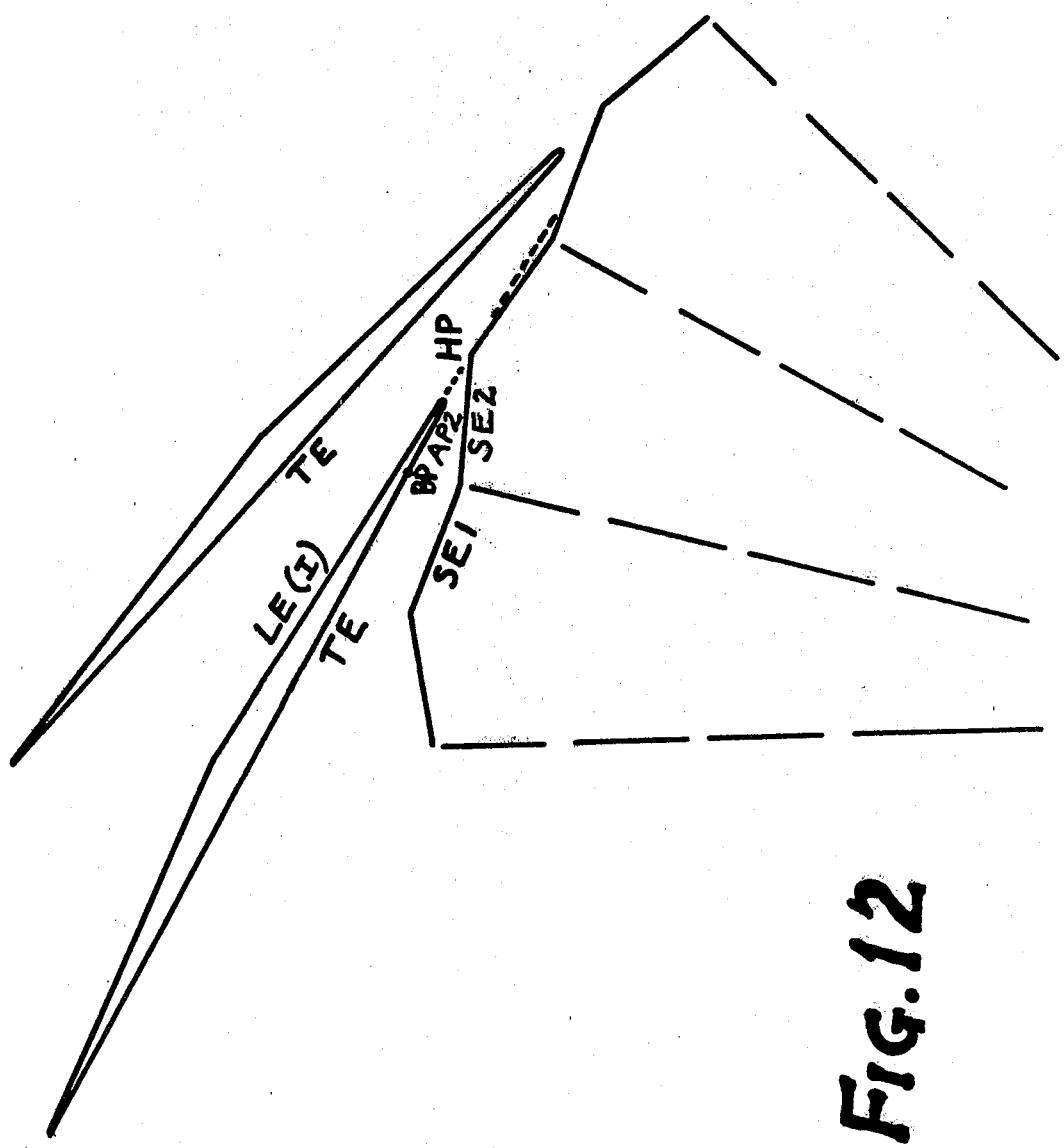
FIGS. 12–22 illustrate different type passageways for fluid entry to the turbine wheel.
Figure 13:
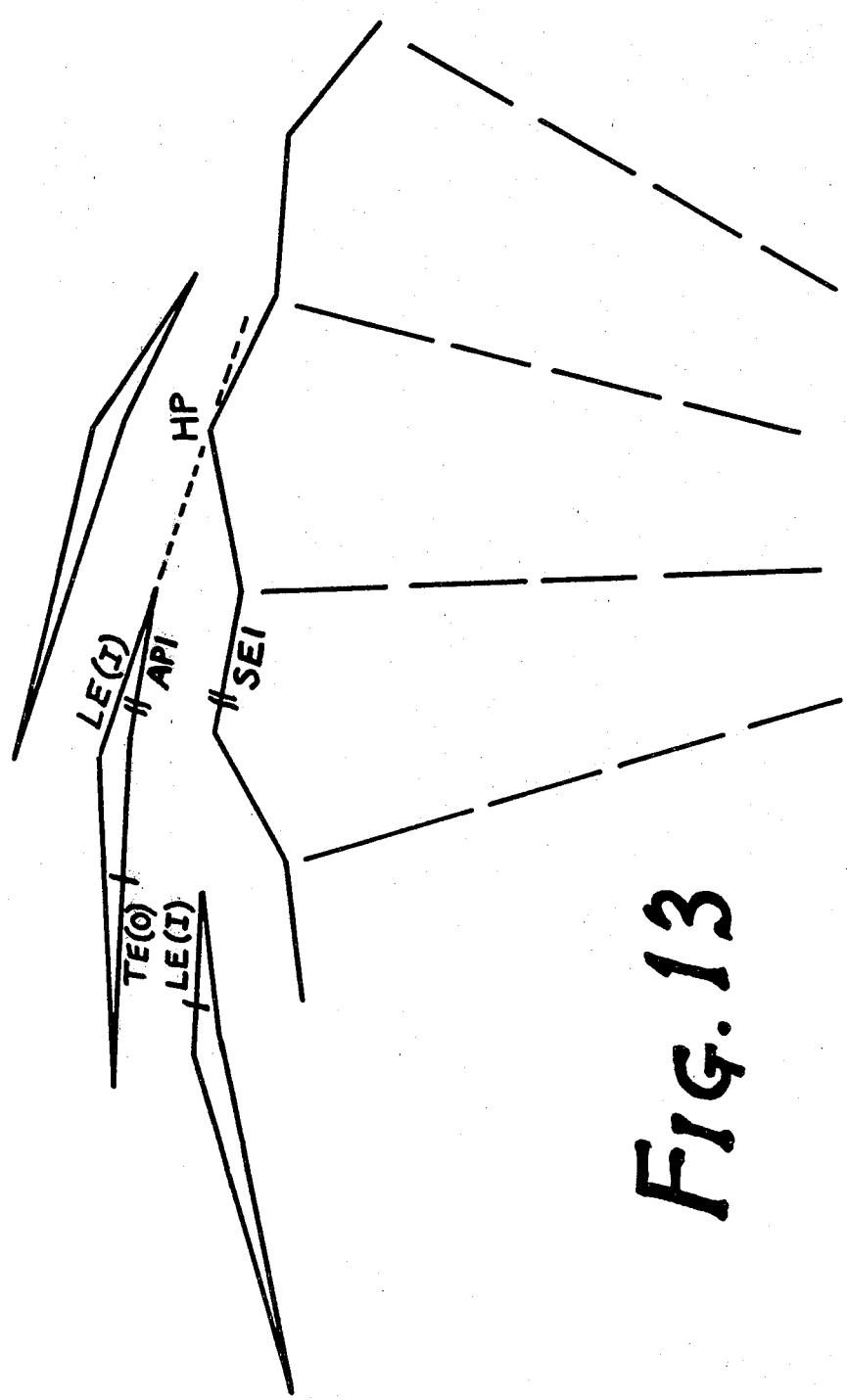
Figure 14:
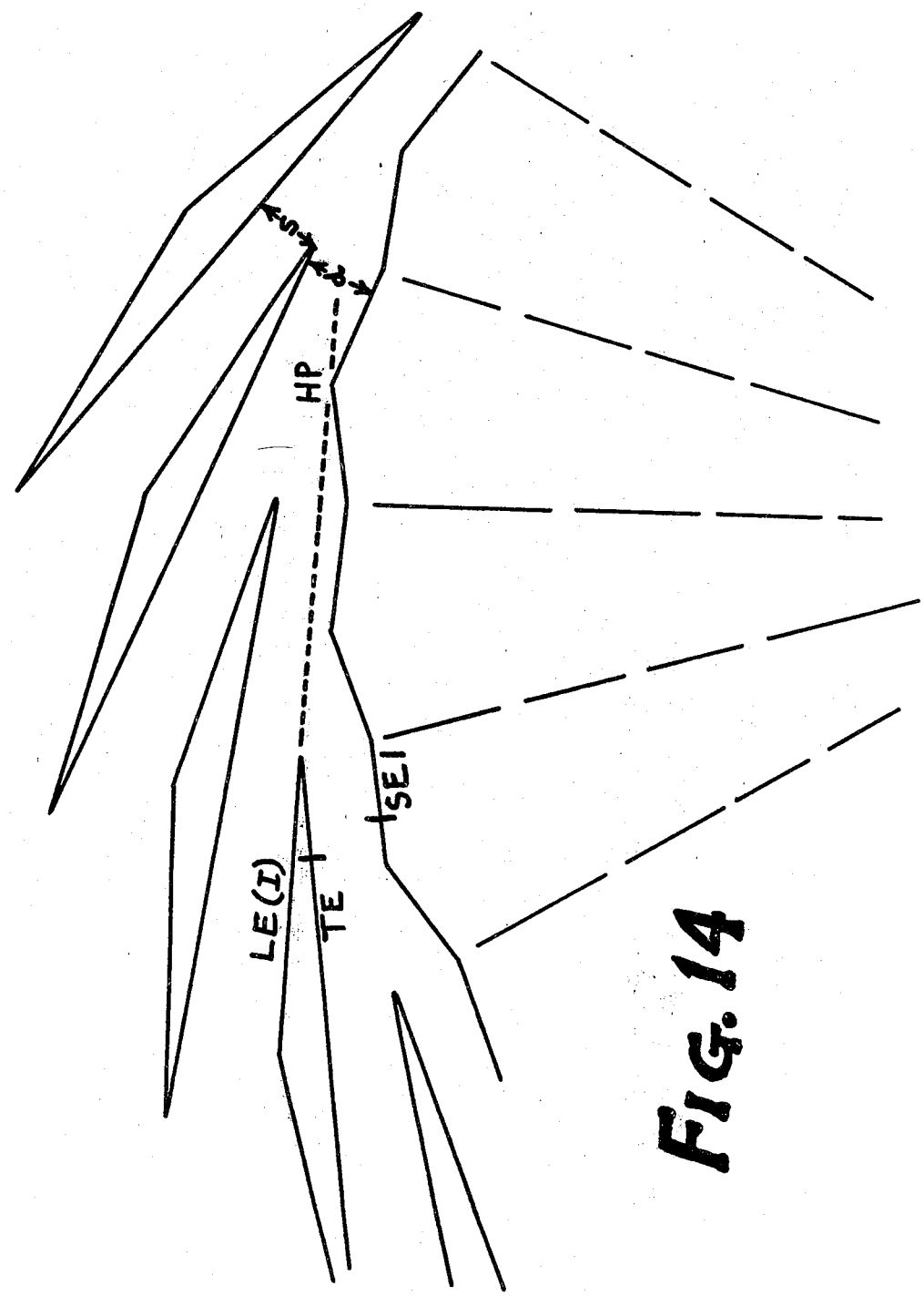
Figure 15:
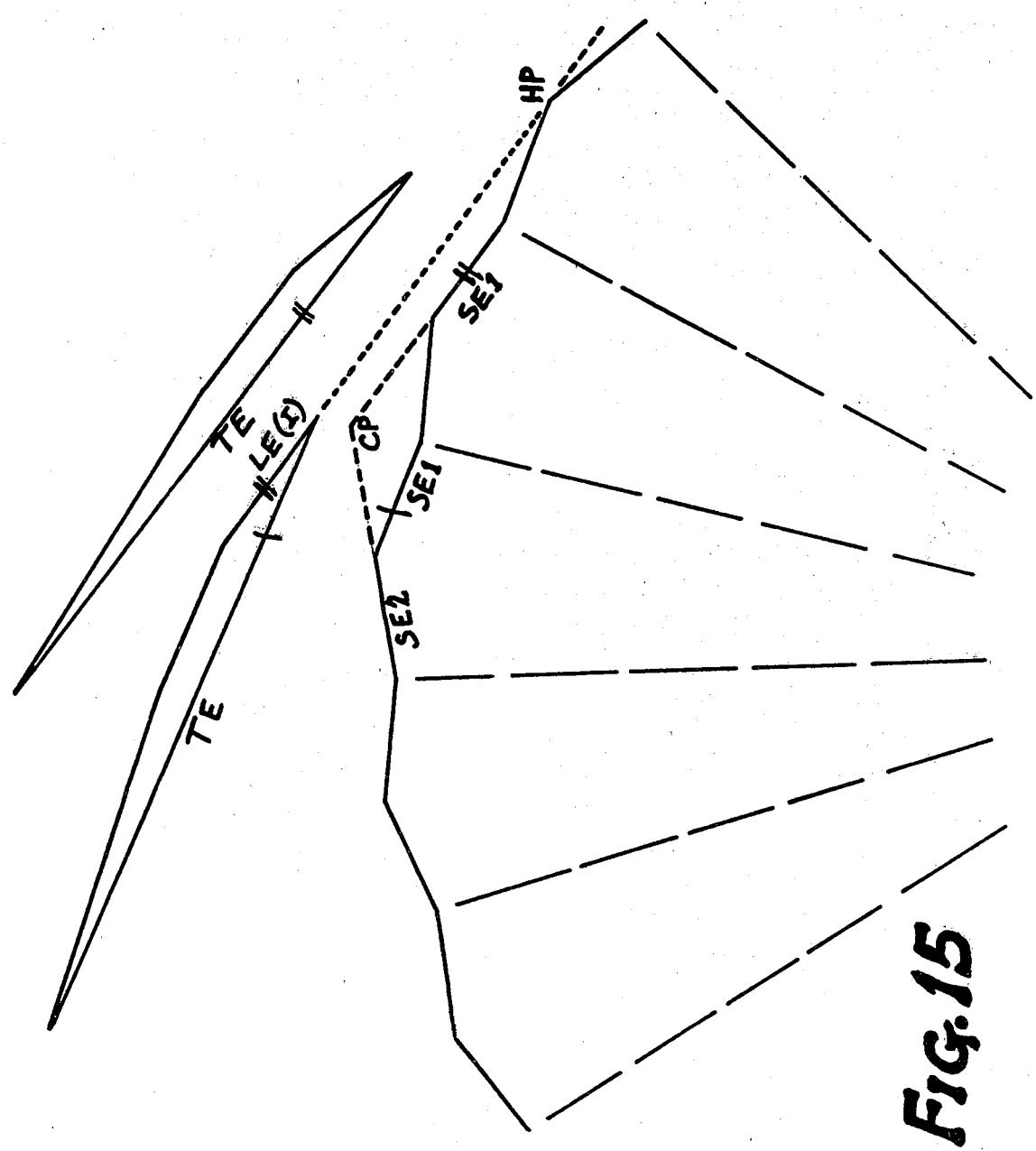
Figure 16:
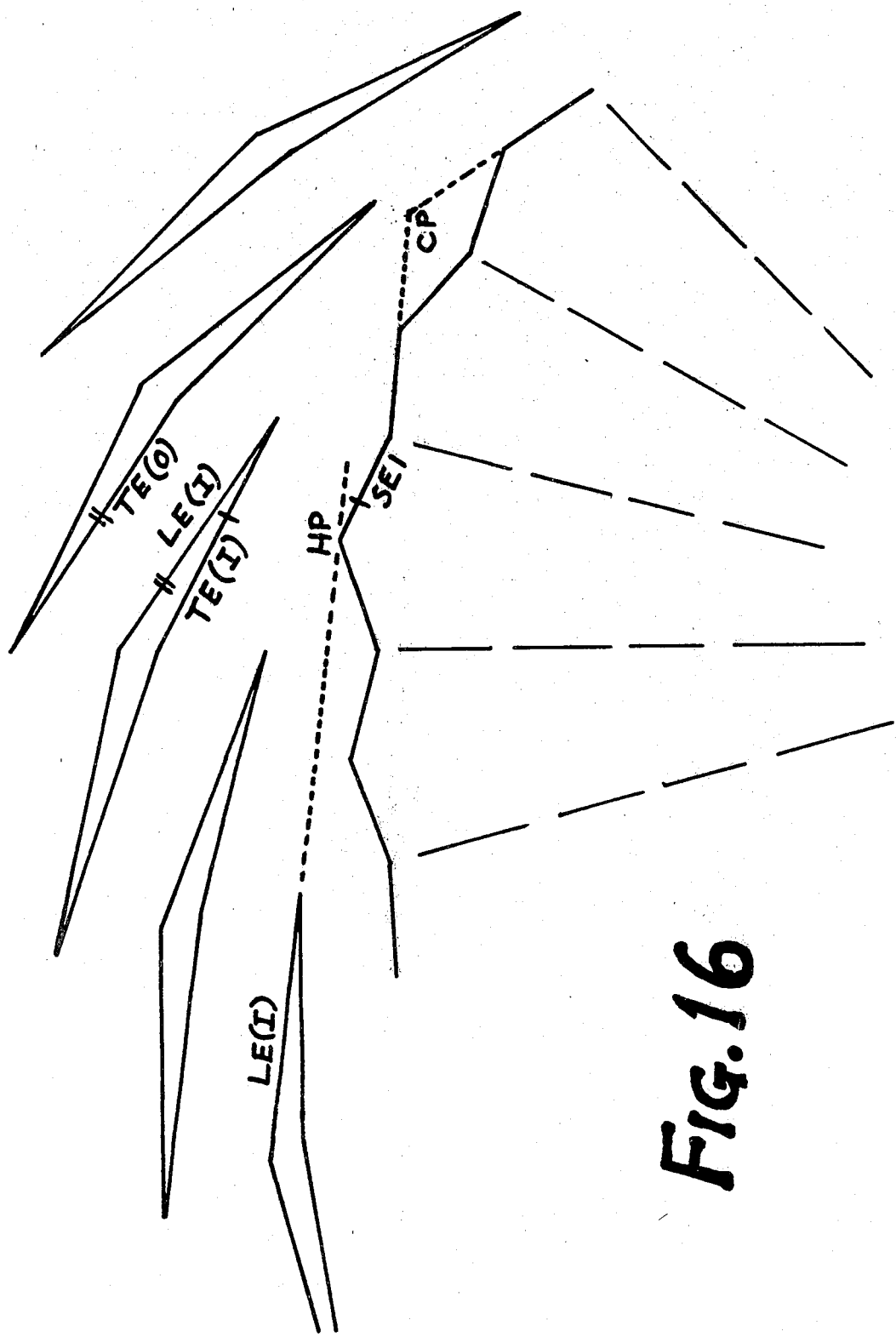

The first significant entry passageway orientation directs the entering fluid efficiently through collinear alignment of the appropriately chosen hub peak HP with the innermost segment of the leading edge LE(I) of each blade. The particular hub peak will thus lie on the radially inner boundary of the idealized straight-line extension from the entry passageway into the annular passageway. The "particular" hub peak will be that which would otherwise interfere with the geometric flow, and will generally be the first or second after the blade in the flow direction. Thus the idealized entering flow tends to miss the peak and minimize the turbulence resulting from impingement, yet occupy the available entry space. Although this option is well-suited for a convergent entry passageway, it is also useful for certain uniform entry passageways, and particularly when the annular passageway is larger than the entry passageway. This first entry passageway orientation is illustrated in FIG. 12 for convergent entry and annular passageways created by a blade having a flat trailing edge, and in FIG. 13 for uniform and equal entry and annular passageways accompanying a concave blade. In both of these figures LE(I) is aimed toward the first peak after the blade. FIGS. 14, 15 and 16 show the aim toward the second hub peak after the blade in uniform annular passageways. FIG. 14 has a convergent entry passageway with $d = s$. FIGS. 15 and 16 have exceptionally deep annular passageways, exceeding the critical point CP, while FIG. 15 has a flat trailing edge and FIG. 16 illustrates concavity.

2. IT-SE1 Collinearity

Figure 17:
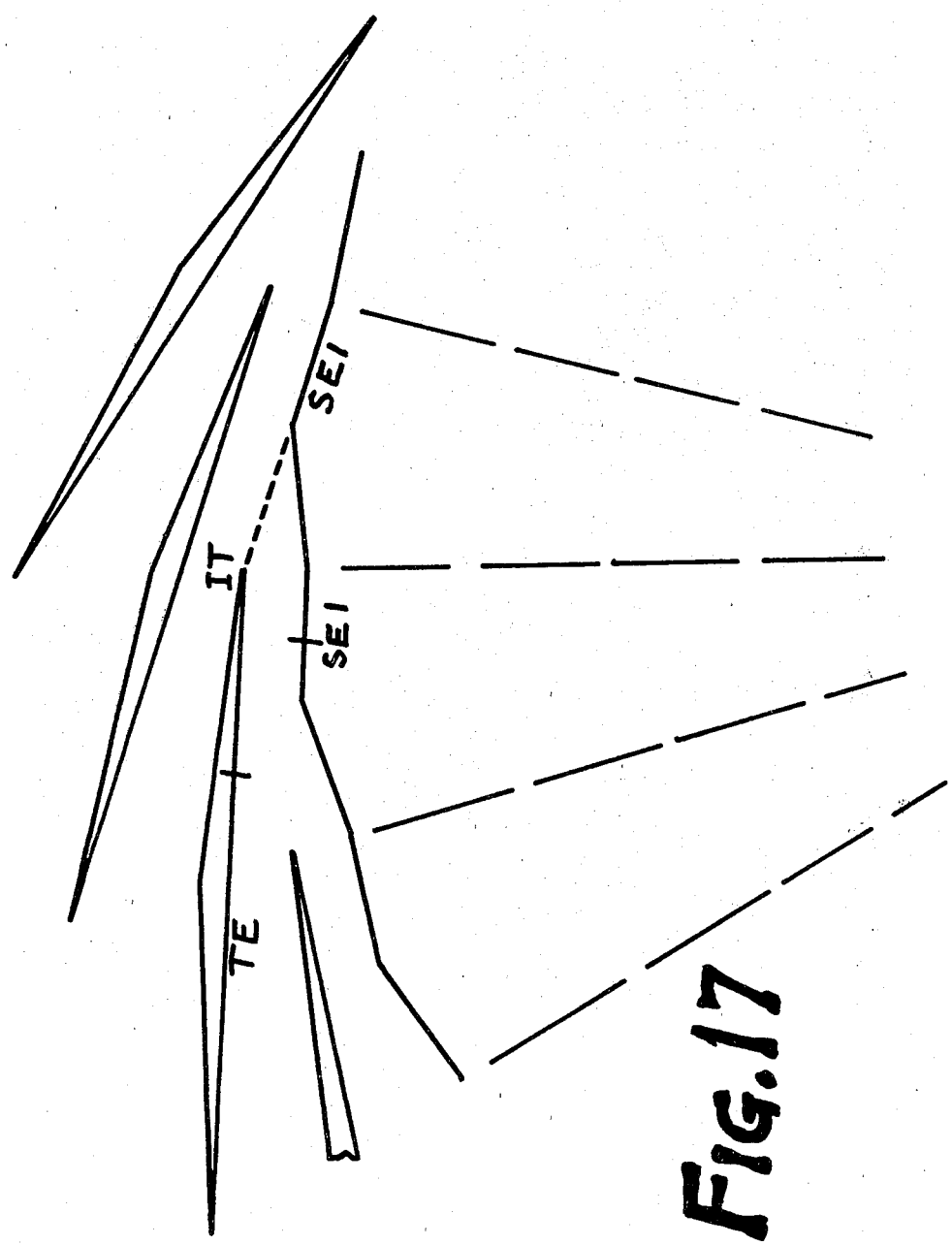
Figure 18:
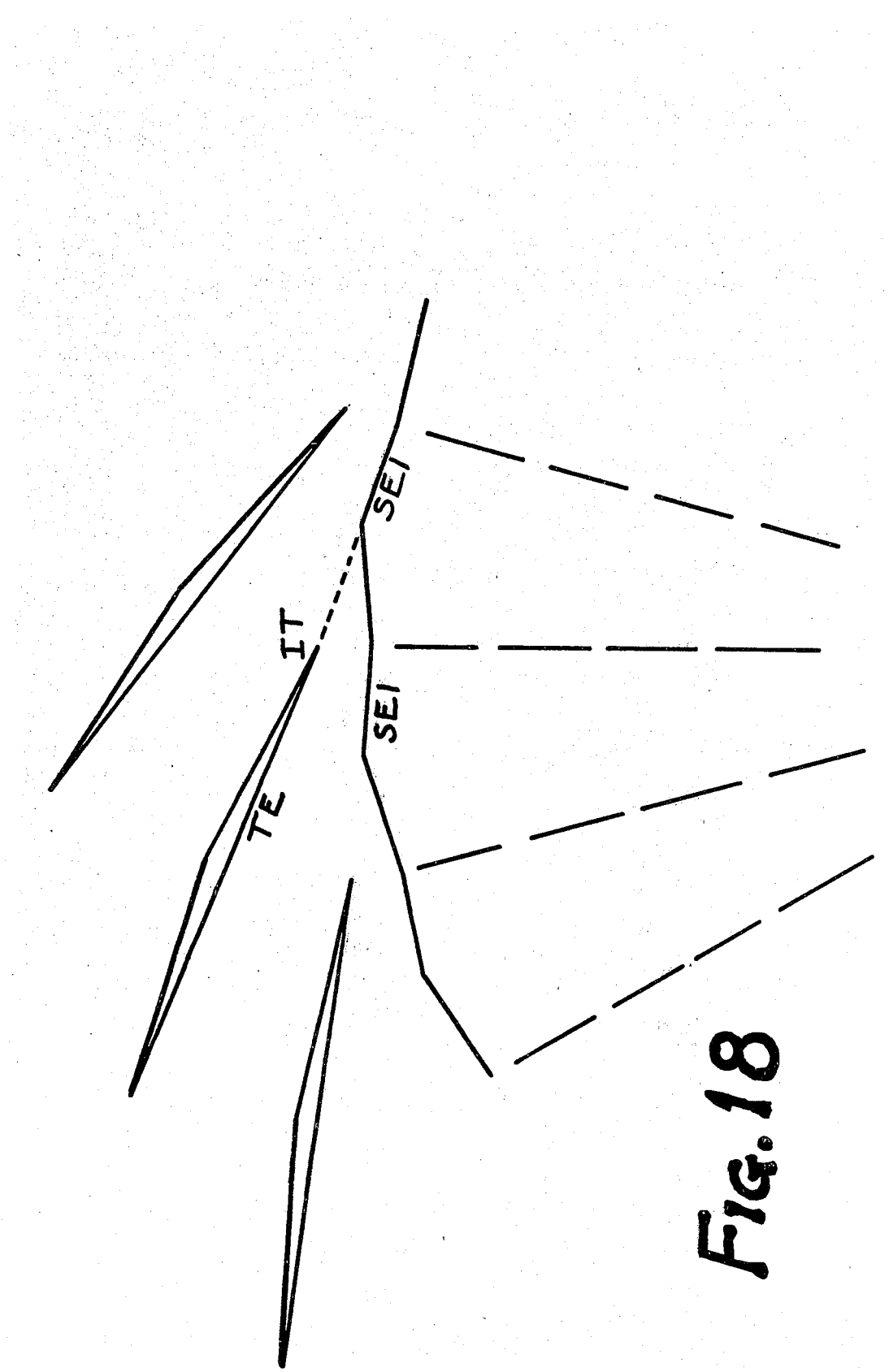

A second valuable entry passageway orientation generates efficient entry in many instances through collinear alignment of the inner tip IT of each blade with the hub sawtooth edge SE1 which is inclined toward a valley in the flow direction. This is quite useful when the blade inner tip IT and the blade peak BP are coincident. Flows streaming off the blade inner tip have been experimentally observed to enter the annular passageway efficiently. See FIG. 17 for a uniform annular passageway and FIG. 18 for a convergent one.

3. LE(I)-SE1 Parallelism

An important third alignment of the entry passageway which promotes streamline conditions and minimizes turbulence is achieved by making the entry passageway flow direction conform to the direction of the appropriate hub sawtooth face which receives and further guides the stream and is inclined to a valley in the flow direction. Thus the innermost segment of the leading edge LE(I) of each blade is made parallel to the hub sawtooth edge SE1, as in FIG. 15 and FIG. 19. This alignment is particularly useful in applying the preferred embodiment principles to the situation where the annular and entry passageways are unequal in size.

4. LE(I)-SE1 Collinearity

Figure 20:
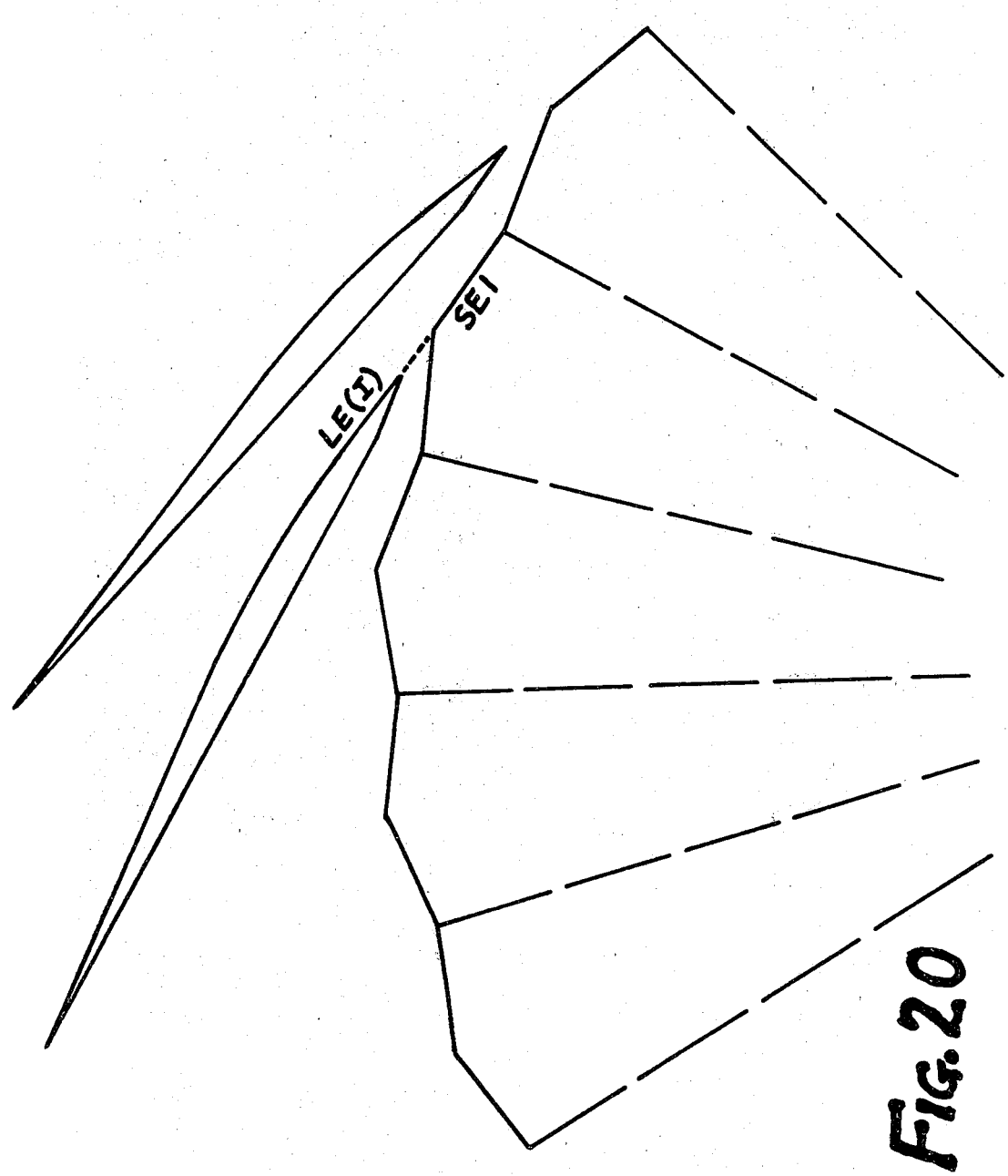
Figure 21:
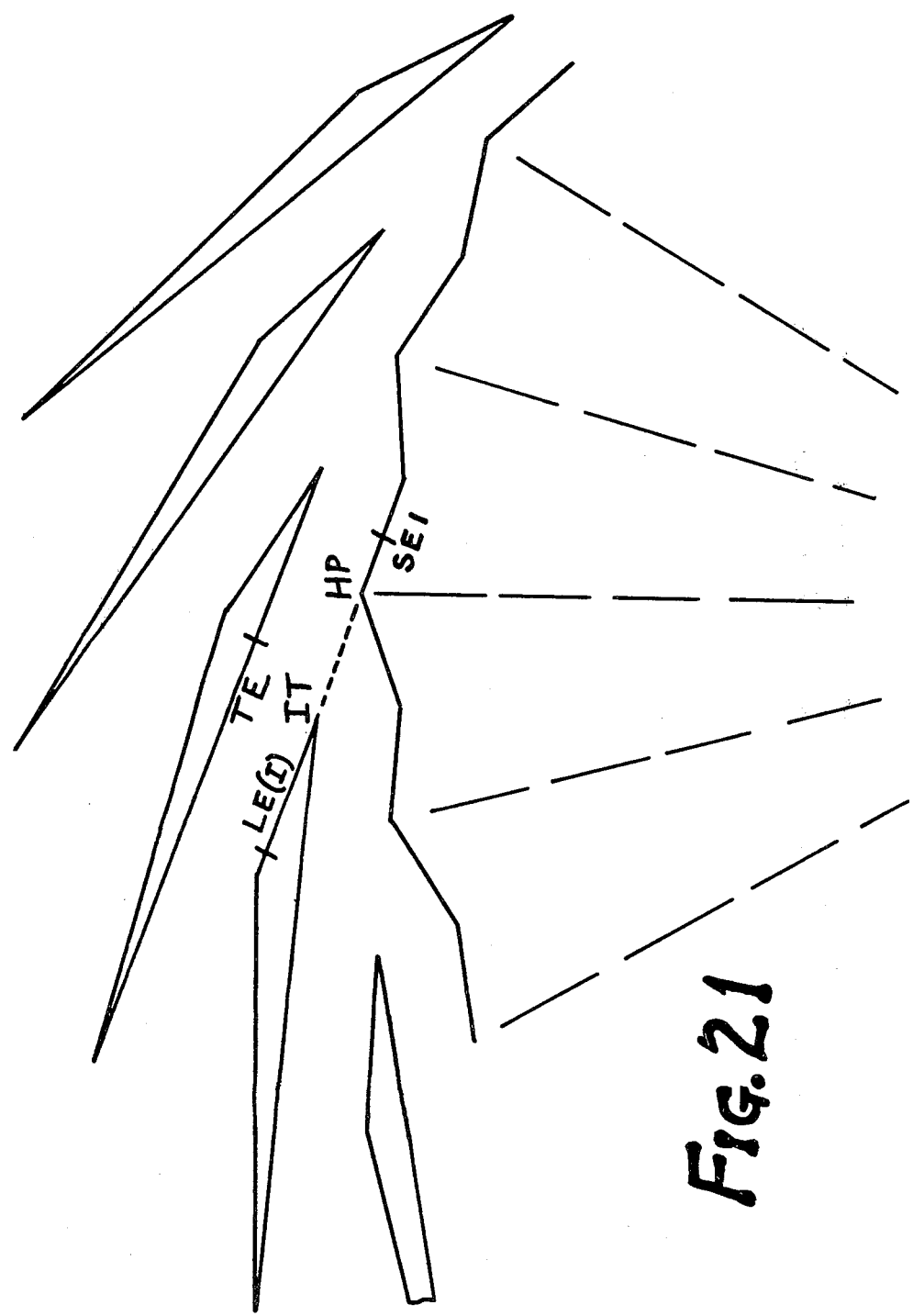

In a large number of turbine wheel designs according to the present invention with uniform and equal entry and annular passageways, a fourth orientation, which is used in the preferred embodiment when the annular and entry passageways are equal in fluid capacity, can be realized. The conformal flow condition, or third alignment of the entry passageway, is achieved simultaneously with the first and second orientations, by making the innermost segment of the leading edge LE(I) be collinear with the hub sawtooth edge SE1 which further guides the stream at the hub. The streamline flow efficiency of annular passageway entry is maximized by this collinear flow condition, for the annular passageway flows are set up with complete consistency. See FIG. 20 for convergent entry and annular passageways, and FIG. 21 for uniform entry and annular passageways.

PREFERRED EMBODIMENT

The basic elements of the preferred embodiment include uniform entry and annular passageways, a symmetrical sawtooth, a blade spanning two wheel sectors with both pressure and lift areas active, and an annular passageway depth $d_{PE}$ linked roughly to the blade inclination angle $\beta$ and the sawtooth edge length $l_H$ by the equation $d_{PE} = l_H \sin 2\beta$.

Figure 19:
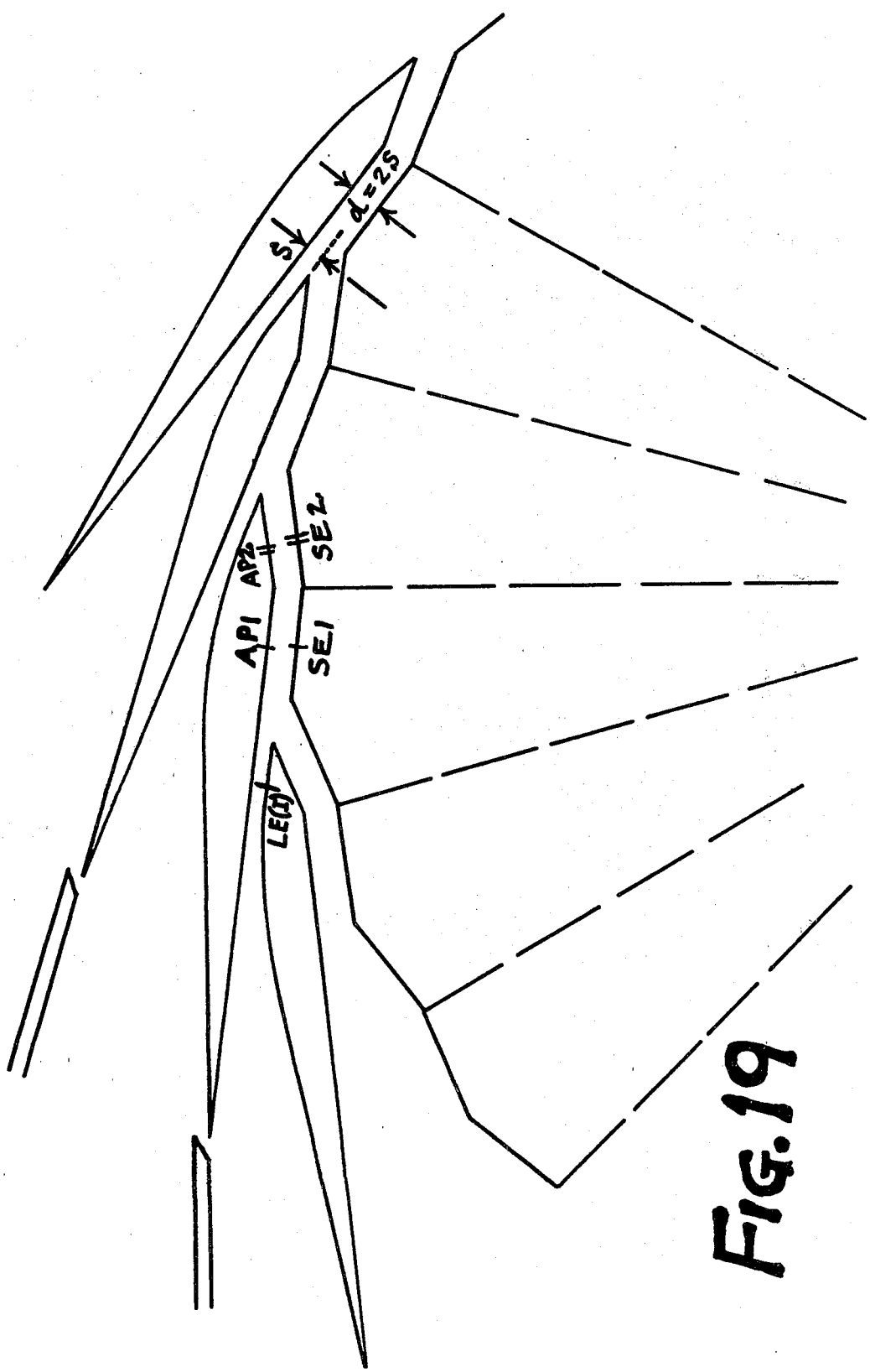
Figure 22:
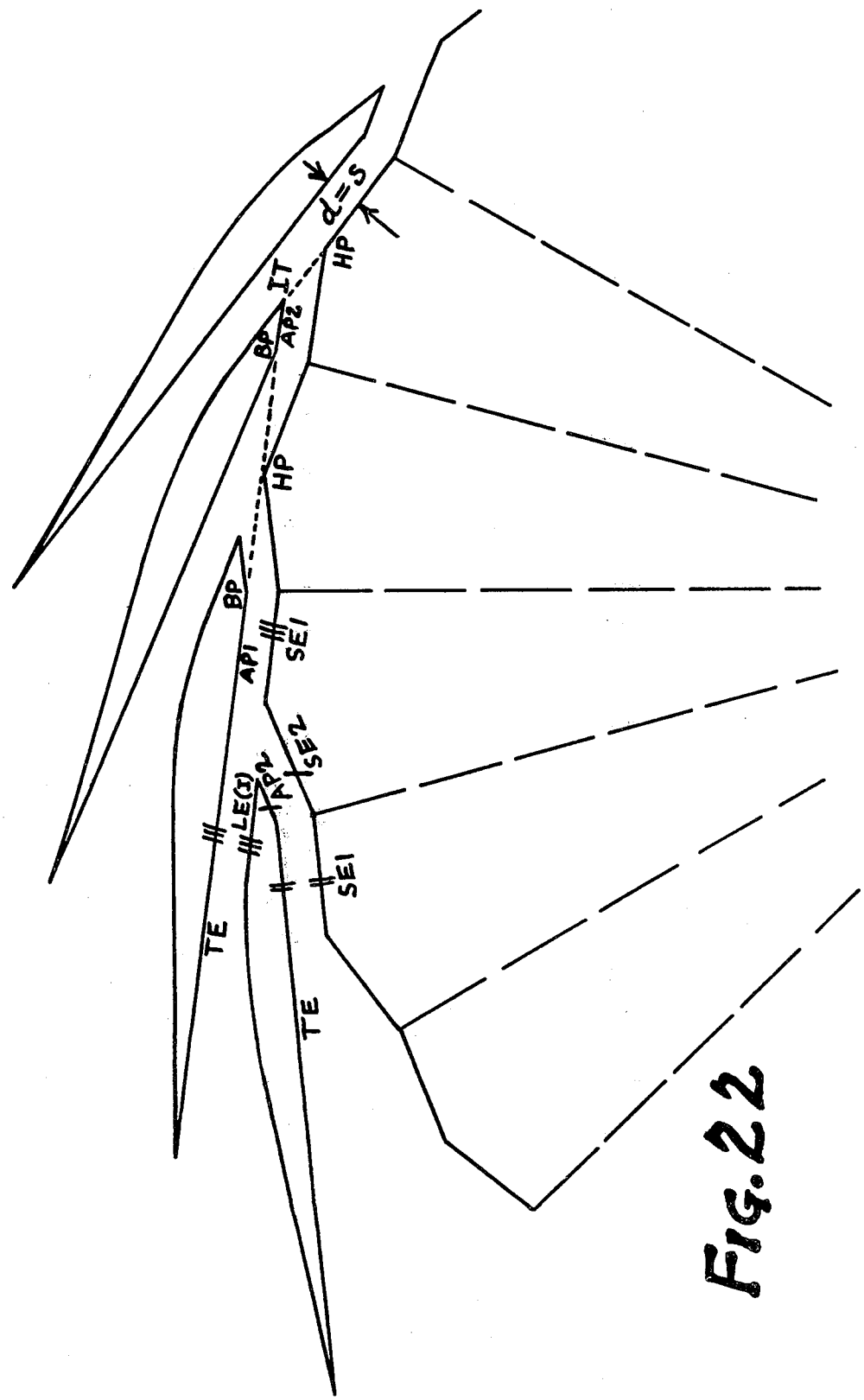

FIG. 22 is a preferred embodiment summary drawing for equal entry and annular passageways, or $d = s$. The fourth alignment discussed above, the collinear flow condition, is satisfied. Compare this figure with FIG. 19, in which $d = 2s$ and the third alignment, or conformal flow condition, is satisfied. Aside from this essential difference in entry passageway size, both figures are identical. Thus FIG. 19 is a preferred embodiment drawing for unequal passageways. In general $d = ms$, where m is an arbitrary integer equal to the number of entry passageways which must each contribute an entering stream portion in order to fill the larger annular passageway. The wheel of FIG. 19 is used with two nozzles to fill the annular passageway. As discussed previously, one nozzle could be moved opposite the other on the periphery, or 180° apart.

SHROUDED WHEEL

Figure 23:
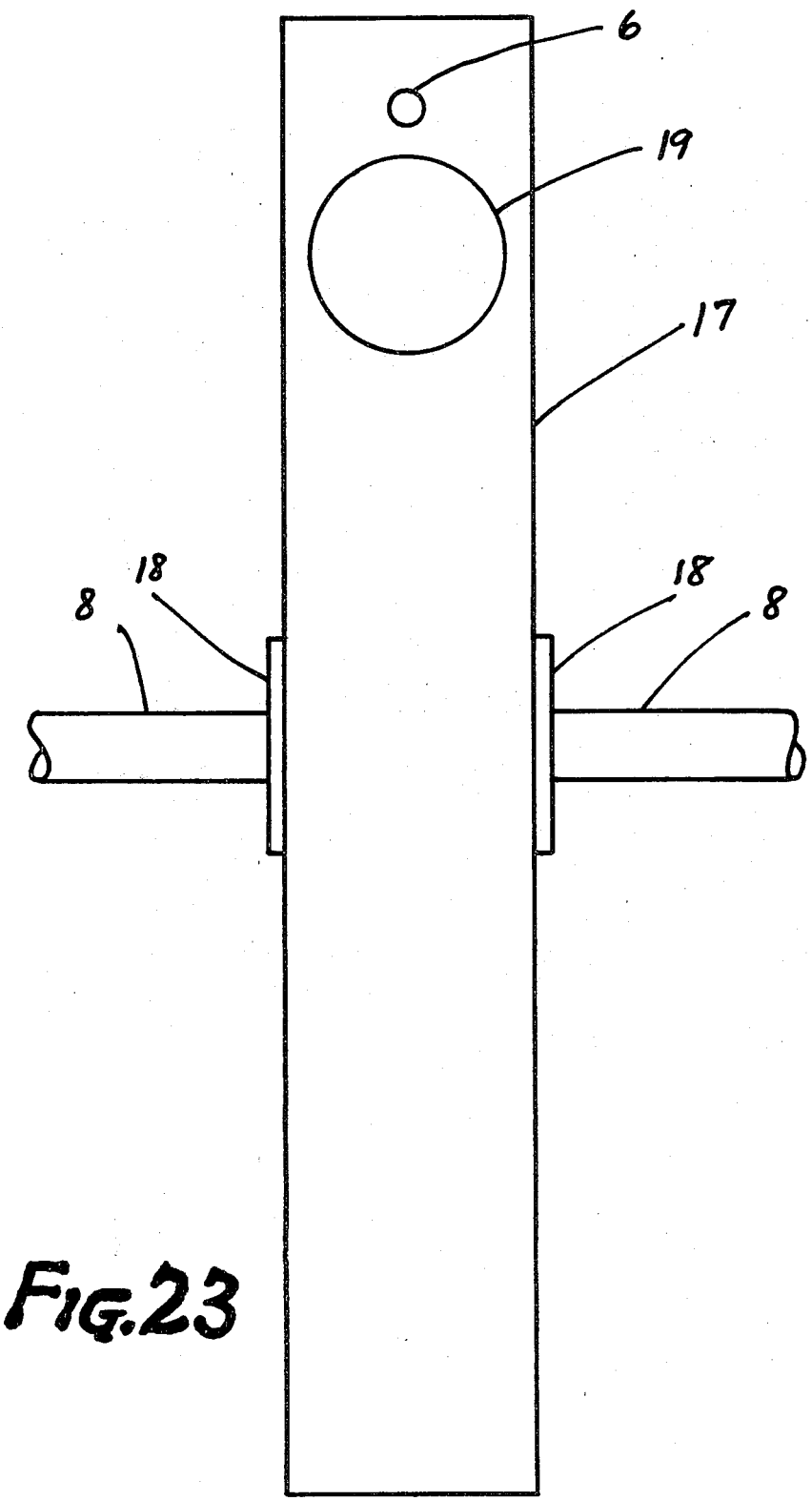
FIG. 23 shows the elements of a shroud for the wheel of FIG. 1.

When a wheel according to the present invention is used with a compressible or incompressible fluid not fully reduced to atmospheric pressure at nozzle injection, a closed shroud should be used to collect to exhaust fluid and maintain the exit pressure. FIG. 23 shows the elements of a shroud for the wheel of FIG. 1. Bearings and mounting plates are not shown. The wheel is encased in a closed right circular cylindrical casing 17 through which the drive shaft 8 protrudes through gas-tight seals 18. The injection nozzle 6 and exhaust pipe 19 are the only openings into the casing, which is not at all fitted to the wheel in order to allow room for centrifugal gas escape everywhere on the periphery except in the nozzle region.

MULTIPLE TRAVERSES OF THE ANNULAR PASSAGEWAY

Sometimes fluid entering the wheel much faster than the wheel velocity is unable to transfer enough energy to the wheel in a single 360 degree traverse to exit centrifugally; then arrangements to achieve multiple passages become desirable to minimize shock and the piston effect.

Relative traverses greater than 360 degrees can be arranged by employing an annular passageway that is wider in the axial direction than the entering stream. Then the trapped fluid can spread out axially within the annular passageway to allow multiple complete circumferential passages before exhaust, thereby minimizing interference with subsequently entering fluid, which would otherwise occur when the trapped fluid returns to the entry zone. See section B of FIG. 24. This axial spreading may be arranged to occur initially in a helical or coiling manner from a nozzle 20 injecting at one end plate 14 toward the other end plate 2. Some consideration should be given to providing an initial axial velocity component, although the fluid will naturally spread out axially in the annular passageway. The piston effect of newly entering fluid will also tend to drive older fluid axially since the transverse boundary is some distance away. It is difficult to say or even determine how long true "coiling" persists as old and new fluid will mix. But fluid will not be exhausted until it loses speed relative to the wheel, nor will it be driven out by the entering stream if it can escape axially into an empty continuation of the annular trapping zone.

Figure 24:
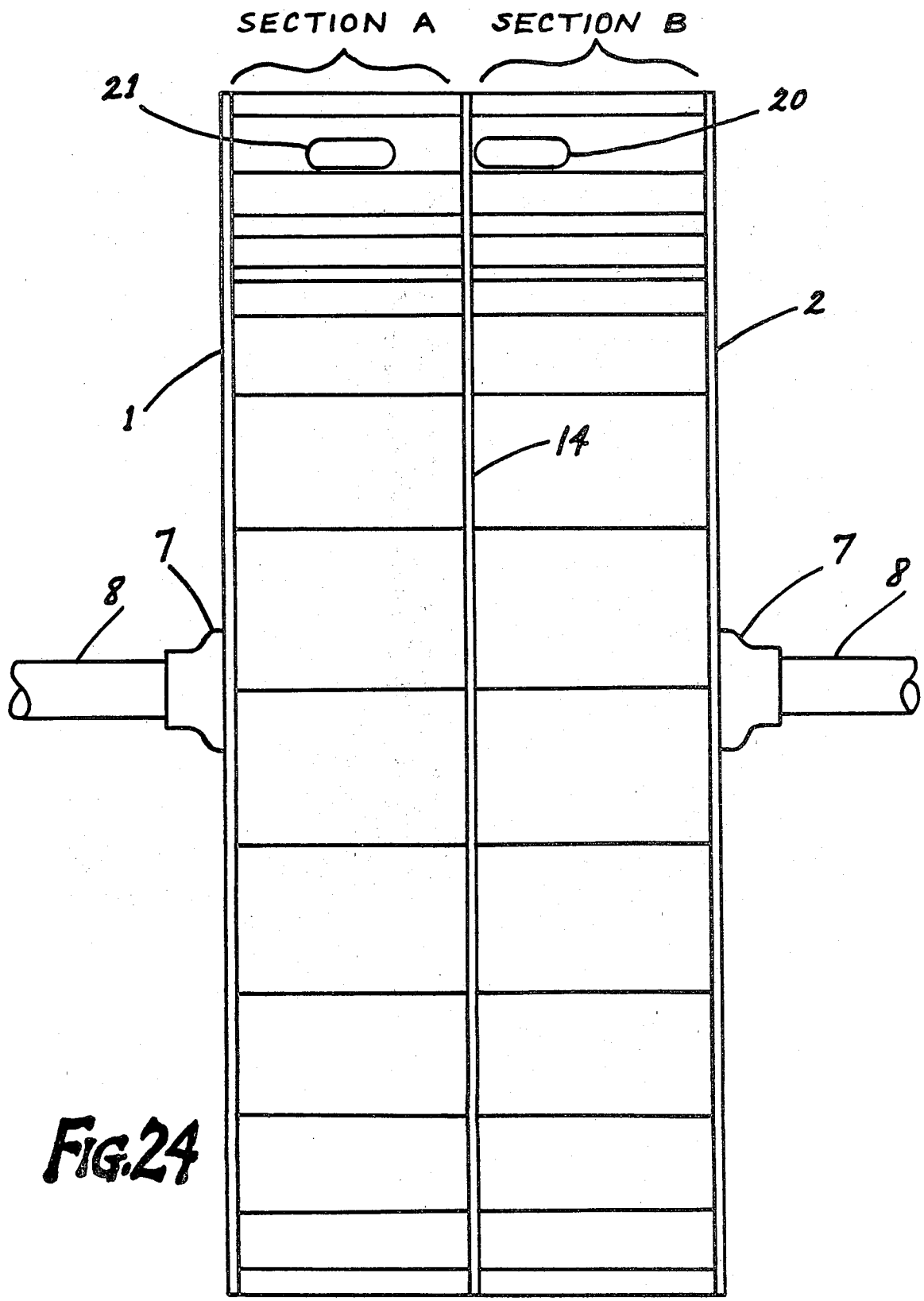

A bifurcated or double coiling stream toward both end plates can be generated, as in wheel section A of FIG. 24, from a central nozzle 21 midway between the end plates 1 and 14.

ESTIMATED ANGULAR CHANGE

Experiments to date with intermediate-speed low-pressure incompressible fluid wheels indicate that values of the combined parameter $(\phi/n)$ in excess of 55 degrees introduce some limited choking that seems to occur sporadically. It appears only in the injection sector at lower wheel speeds and disappears in succeeding sectors, but otherwise has no major deleterious effect. There is also an accompanying backflow. It is not noticed at higher wheel speeds. Values below 50 degrees of this combined parameter appear to be free of this phenomenon. These side effects may become undesirable radpily for higher values of the combined parameter.

Thus a ballpark figure for the total magnitude of geometrical angular change in a single-passage wheel is $\phi \approx 50n°$ conservatively stated.

LINEARIZATION OF THE TURBINE WHEEL FOR LARGE NUMBERS OF BLADES

When designing outward from the hub, the fixation of the hub critical points CP, by extending the edges SE1 and SE2 from adjacent sawteeth, provides a benchmark for deciding the annular passageway depth and determining the placement of the blade peak. See FIG. 8.

When designing inward toward the hub, there is an analogous blade critical point BCP fixed by extending the first and second annular passageway segments AP1 and AP2 from adjacent blades. If AP2 is not present, the extension of the radial through the adjacent hub peak locates BCP at its virtual intersection with the extension of AP1. See the right-hand sectors of FIGS. 9 and 10.

Due to turbine curvature, for relatively low values of n, locating the hub peak HP at the blade critical point BCP (analogously to locating the blade peak BP at the hub critical point CP) results in only a slightly larger annular passageway than the approximate lower bound condition. For this reason, BCP is not significant in delineating the useful range of annular passageway depth for low values of n.

Figure 25:
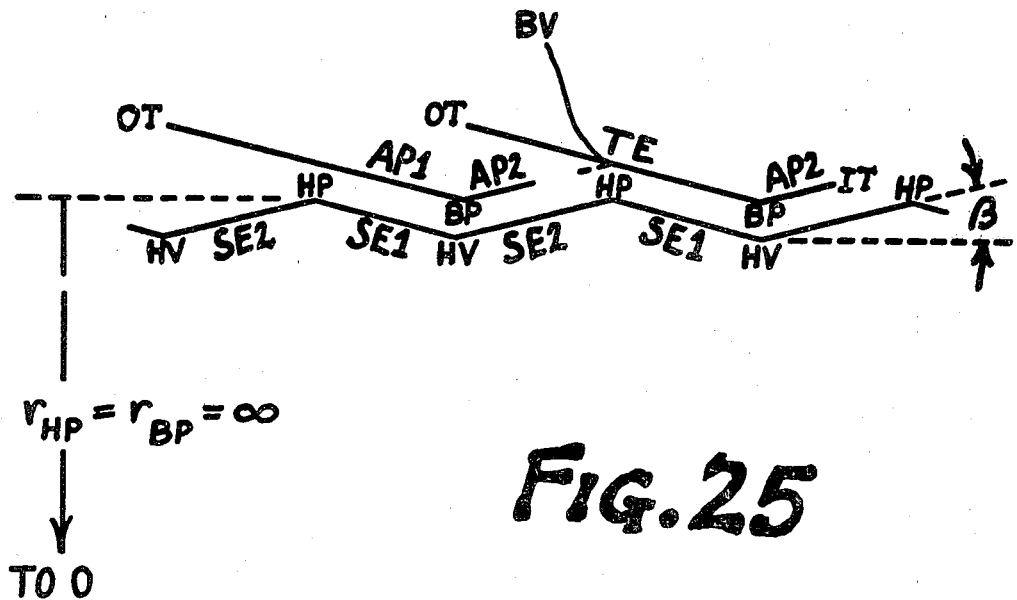
FIGS. 25 and 26 represent theoretical linearized or "straight line" turbine wheels with infinite radii and an infinite number of blades.
Figure 26:
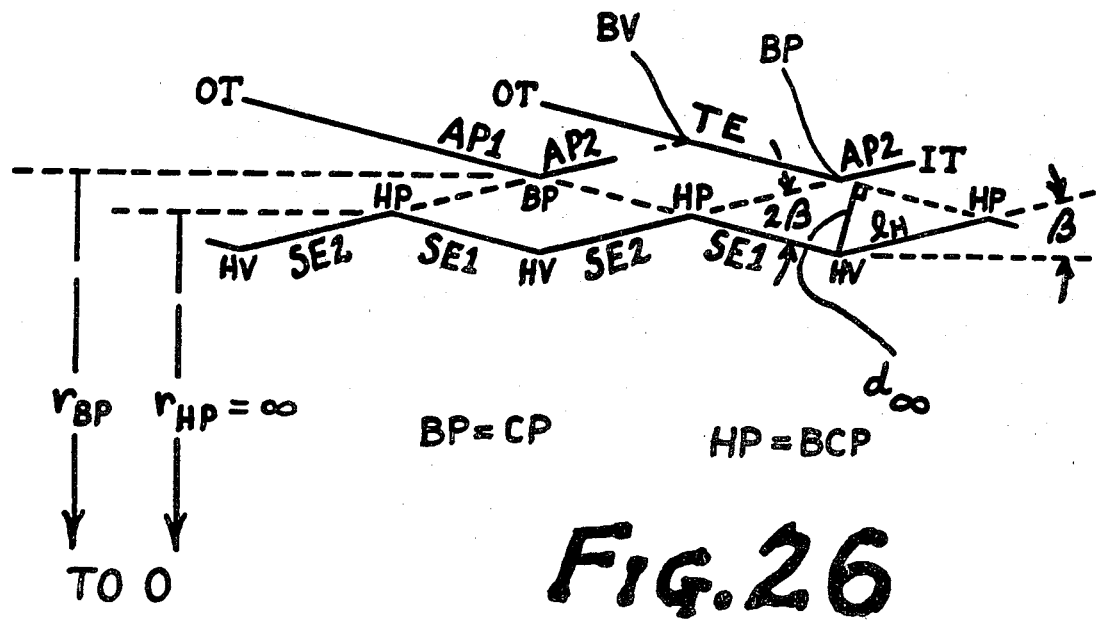
Figure 27:
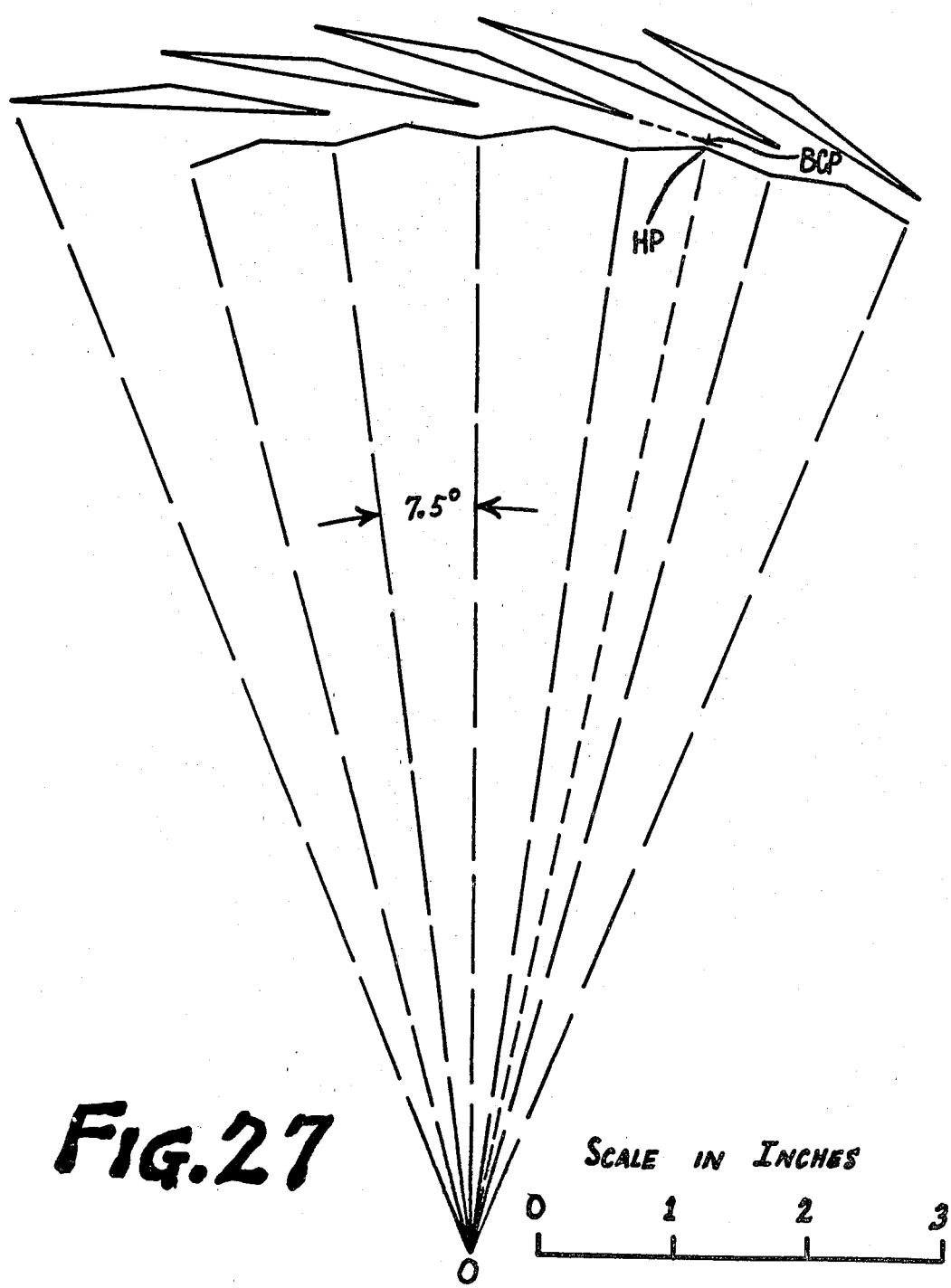
FIG. 27 discloses an alternative embodiment of the present invention, drawn to 48 blades surrounding the turbine wheel.

However, as the number of blades increases, $n \to \infty$, $\theta \to 0$, and BCP→CP. These matters are generally self-explanatory when FIGS. 25 and 26 are examined. These drawings represent theoretical linearized or "straight line" turbine wheels with infinite radii and an infinite number of blades.

FIG. 25 is for the approximate lower bound condition, $r_{HP} = r_{BP}$, while FIG. 26 is executed for the approximate upper bound condition, $r_{BP} = r_{CP}$. FIG. 26 shows that imposition of this condition has automatically produced coincidence of the hub peaks with the blade critical points, or $r_{HP} = r_{BCP}$ also. In addition, from the triangle involving $l_H$ to the right side of FIG. 26, the depth of the passageway for the infinite radius wheel at the approximate upper bound condition becomes $$d_\infty = l_H \sin 2\beta,$$

which is seen to be the passageway depth of the preferred embodiment. This demonstrates that the preferred embodiment merges with the approximate upper bound condition as the number of blades increases.

In practice, the number of blades required to demonstrate this merger effect need not be very large. Compare the closeness of HP and BCP in FIG. 10, where n=24 blades, with that of FIG. 27, which is drawn for n=48 blades. As a practical matter, further doubling to 96 blades places the preferred embodiment nearly at the approximate upper bound.

Since merger does not occur for low values of n, in the low blade number region a turbine wheel based on the fixation of blade peaks through collinearity with sawtooth edges has a greater annular passageway depth than a wheel determined by hub peak collinearity with the annular passageway segments of the blades.

These merger phenomena, that bring the two design approaches into coincidence, and unify the preferred embodiment and the approximate upper bound, for large n, clearly show that we are dealing with facets of the same basic invention.

INDUSTRIAL APPLICABILITY

In addition to a variety of high pressure and high speed applications, the turbine wheel described herein, because of its capacity to generate substantial torque at low RPM, can be used when large quantities of low pressure gases are available. Such applications include the conversion to rotary energy of geothermal steam and steam from subsurface hot water, such as occurs in quantity along the Gulf coast of the U.S. Steam from both of these sources is often highly mineralized and difficult to use in turbines requiring close tolerances. But tolerances between moving parts are not a problem here, and the design and construction of the turbine wheel are such that provisions for quick and easy cleaning can be incorporated.

In addition to applications involving steam and other hot gases from combustion processes, the turbine wheel can be scaled up in both diameter and length, converting the blades into effective air foil sections, which, when suitably shrouded, enable the invention to be utilized as an effective wind turbine.

Also, the turbine wheel is adaptable to the use of incompressible fluids such as water at all pressures. Because of the ability of the turbine wheel to generate torque forces at relatively low speeds, it is well suited for use where substantial volume but relatively low fall levels are encountered, as in rivers along certain sections of the Atlantic seaboard of the U.S.

I claim:

1. A turbine wheel with an integral fluid-dynamic multiple staging or compounding system useful for high as well as lower velocity applications, for extracting energy from at least one tangentially-entering stream of compressible or incompressible fluid, comprising:

a rotatable wheel structure closed on both sides transverse to its axis and closed on an inner circumferential periphery to form an annular passageway that is open on an outer circumferential periphery; and a set of n blades with a fluid-dynamically-shaped profile mounted circumferentially at regular intervals one defined wheel sector apart between said transverse sides on said open outer periphery and suitably inclined and oriented so as to (a) receive said entering stream inwardly between the blades of the wheel sectors that are spanned transiently by said stream such that the outermost segment of the leading edge of the particular one of said blades that is next in line to enter said stream during rotation becomes parallel to the first-encountered boundary of said entering stream no later than the instant that the blade makes contact with said stream, and (b) define a discontinuous surface that will serve as an outermost effective fluidic capturing and constraining boundary of said annular passageway such that the cross-sectional area of said annular passageway is adequately large to pass said entering stream in its entirety, and (c) vector said entering stream by the trailing surface of any blade that is receiving said stream and by the innermost leading surface of the neighboring blade, further inwardly and tangentially into said annular passageway such that the cross-sectional area of the entry passageway between this pair of adjacent blades, as transversely defined by the perpendicular distance s from the inner tip of the neighboring blade to the trailing edge of the receiving blade, to which said perpendicular can be drawn, is adequately large to pass that portion of said entering stream which is introduced between said adjacent pair of said blades, and (d) capture and constrain said stream to continue flowing within said annular passageway by successive fluid-vectoring actions of the annular passageway trailing surfaces of said blades so long as said stream is moving faster than said blades, and (e) receive the final vectoring force of said fluid on the outermost trailing surfaces of said blades as said fluid is exhausted radially outward by centrifugal force through said blades after losing enough velocity so said discontinuous surface no longer constitutes the outermost effective fluidic capturing and constraining boundary, and wherein said fluid-dynamically-shaped profile of said blades is defined by an acute angle $\alpha$ between the outermost segment of the leading edge of any blade and the outermost segment of the trailing edge of the blade, and an obtuse angle $\delta$ between the outermost segment of the trailing edge and the first annular passageway segment of the trailing edge of the blade, and wherein said first annular passageway segment spans about half of a wheel sector, and an obtuse angle $\chi$ defining a blade peak between the first and second annular passageway segments of the blade, and wherein said second annular passageway segment lies in the range between zero and the maximum length which does not block entry of the fluid into the annular passageway, together with rounding of geometrically sharp surfaces to maintain durability, structural integrity, and streamline flow characteristics of the blade, and wherein the inclination of said blades is defined by an acute angle $\beta$ between the first annular passageway segment of the trailing edge of any blade and the tangential direction at the peak of the blade; and means for fluid vectoring on said inner periphery of said annular passageway in a geometrically alternating and cooperative manner with respect to said successive fluid-vectoring actions of said blades.

2. A turbine wheel according to claim 1 wherein said means for fluid vectoring on said inner periphery of said annular passageway is a set of 2n circumferentially mounted planar surfaces which constitute a closed polyhedral sawtooth-edged hub with two sawtooth edges intersecting at a hub valley that is radially adjacent to the blade peak of one of said blades and oriented such that the first of said sawtooth edges is inclined radially inwardly in the fluid flow direction to said hub valley, where it makes an acute angle of inclination $\beta'$ with respect to the tangential direction, and together with said first annular passageway segment of the blade, constitutes a portion of said annular passageway such that the cross-sectional area of said portion, as transversely defined by the perpendicular distance d from said blade peak to the nearby edges of said hub sawtooth, is adequately large to pass said entering stream in its entirety and vector the stream flowing in said annular passageway radially inwardly, while the second of said sawtooth edges is inclined radially outwardly in the said fluid flow direction from said hub valley, where it makes an acute angle of inclination $\beta''$ with respect to the tangential direction, to a hub peak, and together with said second annular passageway segment of the blade, constitutes a portion of said annular passageway such that the cross-sectional area of said portion is also adequately large to pass said entering stream in its entirety and vector the stream flowing in said annular passageway radially outwardly toward the first annular passageway segment of the trailing edge of the next blade to be encountered by the fluid flow, with said alternate radially inward and outward vectoring actions within said annular passageway continuing until the velocity of the fluid relative to the annular passageway reaches zero allowing fluid exhaust radially outward between said blades, and any geometrically sharp surfaces may be rounded to facilitate streamline flow.

3. A turbine wheel according to claim 2 wherein the radius drawn from the wheel center to each of said blade peaks is made equal to the radius drawn from the wheel center to each of said hub peaks.

4. A turbine wheel according to claim 2 wherein each of said blade peaks is made collinear with one of said hub sawtooth edges that are inclined radially outwardly in the fluid flow direction to hub peaks, and is also made collinear with the one of said hub sawtooth edges that is inclined radially inwardly to a hub valley from the next hub peak encountered in the fluid flow direction.

5. A turbine wheel according to claim 2 wherein said sawtooth-edged hub surface has a symmetrical sawtooth in the flow direction with said intersecting sawtooth edges being of equal length, to make the angles of inclination of said first and second sawtooth edges be equal, or $\beta' = \beta''$.

6. A turbine wheel according to claim 5 wherein said first and second annular passageway segments of each of said blades are parallel respectively to the adjacent first and second hub sawtooth edges, to define a sequence of uniform cross section portions of said annular passageway, and to make the blade angle of inclination be equal to the sawtooth edges angles of inclination, or $\beta = \beta' = \beta''$.

7. A turbine wheel according to claim 6 wherein at the wheel periphery the entering stream spans and can be introduced into m wheel sectors, so that the perpendicular distance s from the inner tip of each of said blades to the trailing edge of the adjacent receiving blade, to which said perpendicular can be drawn, when multiplied by m, is made approximately equal to the perpendicular distance d from the blade peak of each of said blades to the nearby edges of said hub sawtooth, or $d \approx ms$, making the size of the annular passageway be about m times the size of the entry passageway between adjacent blades.

8. A turbine wheel according to claim 6 wherein the perpendicular distance s from the inner tip of each of said blades to the trailing edge of the adjacent receiving blade, to which said perpendicular can be drawn, is made approximately equal to the perpendicular distance d from the blade peak of each of said blades to the nearby edges of said hub sawtooth, or $d \approx s$, making the annular and entry passageways be about equal in size.

9. A turbine wheel according to claim 8 wherein the outermost segment of the trailing edge of each of said blades is made parallel to the innermost segment of the leading edge of the neighboring blade to make uniform entry passageways between adjacent blades.

10. A turbine wheel according to claim 6 wherein the inner tip of each of said blades is made collinear with the first of said hub sawtooth edges that is inclined in the flow direction to said hub valley.

11. A turbine wheel according to claim 10 wherein the outermost segment of the trailing edge of each of said blades is made parallel to the innermost segment of the leading edge of the neighboring blade to make uniform entry passageways between adjacent blades.

12. A turbine wheel according to claim 6 wherein each of said hub peaks is made collinear with the innermost segment of the leading edge of one of said blades.

13. A turbine wheel according to claim 6 wherein each of said hub peaks is made collinear with said first annular passageway segment of one of said blades, and is also made collinear with said second annular passageway segment of the next blade encountered in the fluid flow direction.

14. A turbine wheel according to claim 6 wherein the innermost segment of the leading edge of each of said blades is made parallel to the first of said hub sawtooth edges that is inclined in the flow direction to said hub valley.

15. A turbine wheel according to claim 6 wherein the innermost segment of the leading edge of each of said blades is made collinear with the first of said hub sawtooth edges that is inclined in the flow direction to said hub valley.

16. A turbine wheel according to claim 15 wherein the outermost segment of the trailing edge of each of said blades is made parallel to the innermost segment of the leading edge of the neighboring blade to make uniform entry passageways between adjacent blades.

17. A turbine wheel according to claim 6 wherein the outermost segment of the trailing edge of each of said blades is made parallel to the innermost segment of the leading edge of the neighboring blade to make uniform entry passageways between adjacent blades.

18. A turbine wheel according to claim 2 wherein said sawtooth-edged hub surface has an unsymmetrical sawtooth in the flow direction with said intersecting sawtooth edges being of unequal length, to make the angles of inclination of said first and second sawtooth edges be unequal, or $\beta' \neq \beta''$.

19. A turbine wheel according to claim 2 wherein said first and second annular passageway segments of each of said blades have non-parallel orientations with respect to the adjacent first and second hub sawtooth edges, to define a sequence of periodically converging portions of said annular passageway in the fluid flow direction.

20. A turbine wheel according to claim 19 wherein the inner tip of each of said blades is made collinear with the first of said hub sawtooth edges that is inclined in the flow direction to said hub valley.

21. A turbine wheel according to claim 19 wherein each of said hub peaks is made collinear with the innermost segment of the leading edge of one of said blades.

22. A turbine wheel according to claim 19 wherein the innermost segment of the leading edge of each of said blades is made collinear with the first of said hub sawtooth edges that is inclined in the flow direction to said hub valley.

23. A turbine wheel according to claim 2 wherein said first and second annular passageway segments of each of said blades are parallel respectively to the adjacent first and second hub sawtooth edges, to define a sequence of uniform cross section portions of said annular passageway, and to make the blade angle of inclination be equal to the first sawtooth edge angle of inclination, or $\beta = \beta'$.

24. A turbine wheel according to claims 2 or 3 or 4 or 5 or 18 or 19 or 20 or 21 or 22 or 23 or 6 or 7 or 8 or 10 or 12 or 13 or 14 or 15 or 17 or 9 or 11 or 16, wherein the acute central angle $\sigma$ spanned at the center by each of said blades from the outer tip to the blade peak lies in the range of one to three wheel sectors.

25. A turbine wheel according to claim 24 further comprising a closed fitted shroud surrounding said wheel to confine a compressible fluid and pierced for at least one entry nozzle and also pierced for at least one exit port as far away from said nozzle as possible on the periphery in the direction of rotation.

26. A turbine wheel according to claim 25 further comprising means for supporting the span of each of said blades in at least one location within said annular passageway when the blades are lengthened in the axial direction to increase the width and therefore the capacity of said wheel.

27. A turbine wheel according to claim 24 further comprising means for supporting the span of each of said blades in at least one location within said annular passageway when the blades are lengthened in the axial direction to increase the width and therefore the capacity of said wheel.

28. A turbine wheel according to claims 2 or 3 or 4 or 5 or 18 or 19 or 20 or 21 or 22 or 23 or 6 or 7 or 8 or 10 or 12 or 13 or 14 or 15 or 17 or 9 or 11 or 16, wherein the width of said entering stream in the axial direction is less than the width of the wheel between said transverse sides, and said entering stream is tangentially directed into the wheel, and axially centered and directed on the wheel such that the stream may spread out in both axial directions within said annular passageway toward said transverse sides, to minimize interference within the entering stream and the coiling bifurcated continuing streams when the fluid makes more than one 360 degree circumferential passage of said annular passageway before being exhausted from the wheel.

29. A turbine wheel according to claim 28 further comprising means for supporting the span of each of said blades in at least one location within said annular passageway when the blades are lengthened in the axial direction to increase the width and therefore the capacity of said wheel.

30. A turbine wheel according to claim 28 wherein the acute central angle $\sigma$ spanned at the center by each of said blades from the outer tip to the blade peak lies in the range of one to three wheel sectors.

31. A turbine wheel according to claim 30 further comprising means for supporting the span of each of said blades in at least one location within said annular passageway when the blades are lengthened in the axial direction to increase the width and therefore the capacity of said wheel.

32. A turbine wheel according to claim 30 further comprising a closed fitted shroud surrounding said wheel to confine a compressible fluid and pierced for at least one entry nozzle and also pierced for at least one exit port as far away from said nozzle as possible on the periphery in the direction of rotation.

33. A turbine wheel according to claim 32 further comprising means for supporting the span of each of said blades in at least one location within said annular passageway when the blades are lengthened in the axial direction to increase the width and therefore the capacity of said wheel.

34. A turbine wheel according to claims 2 or 3 or 4 or 5 or 18 or 19 or 20 or 21 or 22 or 23 or 6 or 7 or 8 or 10 or 12 or 13 or 14 or 15 or 17 or 9 or 11 or 16, wherein the width of said entering stream in the axial direction is less than the width of the wheel between said transverse sides, and said entering stream is directed into the wheel tangentially and axially from one transverse side toward the other side such that the stream may spread out in the axial direction within said annular passageway to minimize interference within the entering stream and the coiling continuing stream when the fluid makes more than one 360 degree circumferential passage of said annular passageway before being exhausted from the wheel.

35. 35, A turbine wheel according to claim 34 further comprising means for supporting the span of each of said blades in at least one location within said annular passageway when the blades are lengthened in the axial direction to increase the width and therefore the capacity of said wheel.

36. A turbine wheel according to claim 34 wherein the acute central angle $\sigma$ spanned at the center by each of said blades from the outer tip to the blade peak lies in the range of one to three wheel sectors.

37. A turbine wheel according to claim 36 further comprising means for supporting the span of each of said blades in at least one location within said annular passageway when the blades are lengthened in the axial direction to increase the width and therefore the capacity of said wheel.

38. A turbine wheel according to claim 36 further comprising a closed fitted shroud surrounding said wheel to confine a compressible fluid and pierced for at least one entry nozzle and also pierced for at least one exit port as far away from said nozzle as possible on the periphery in the direction of rotation.

39. A turbine wheel according to claim 38 further comprising means for supporting the span of each of said blades in at least one location within said annular passageway when the blades are lengthened in the axial direction to increase the width and therefore the capacity of said wheel.

40. A turbine wheel according to claims 2 or 3 or 4 or 5 or 18 or 19 or 20 or 21 or 22 or 23 or 6 or 7 or 8 or 10 or 12 or 13 or 14 or 15 or 17 or 9 or 11 or 16, further comprising means for supporting the span of each of said blades in at least one location within said annular passageway when said blades are lengthened in the axial direction to increase the width and therefore the capacity of said wheel.

* * * * *